United States Patent [19]

King

[11] Patent Number: 4,512,904

[45] Date of Patent: Apr. 23, 1985

[54] IN-CASSETTE LOADING MACHINE

[76] Inventor: James L. King, 8520 Bay Hill Blvd., Orlando, Fla. 32811

[21] Appl. No.: 433,237

[22] Filed: Oct. 7, 1982

[51] Int. Cl.³ .......................... B65H 19/20; B31F 5/06
[52] U.S. Cl. ................................ 242/56 R; 242/58.4; 156/502
[58] Field of Search .................. 242/56 R, 58.3, 58.4; 156/502, 505, 506

[56] References Cited

U.S. PATENT DOCUMENTS

| | | | |
|---|---|---|---|
| 4,061,286 | 12/1977 | King, Sr. et al. | 156/502 X |
| 4,062,719 | 12/1977 | Masuzima et al. | 156/506 X |
| 4,328,065 | 5/1982 | Kincheloe et al. | 156/505 X |
| 4,364,791 | 12/1982 | Kincheloe | 156/506 |
| 4,385,959 | 5/1983 | Goguen | 156/506 |
| 4,417,942 | 11/1983 | Kincheloe | 156/502 |

Primary Examiner—Stuart S. Levy
Assistant Examiner—Lloyd D. Doigan
Attorney, Agent, or Firm—Schiller & Pandiscio

[57] ABSTRACT

A machine for loading magnetic tape into cassettes is provided which comprises a splicing block assembly mounted on a pivotally mounted support and comprising two splicing blocks, one fixed to the support and the second pivotally mounted to the support, means for rotating the second block relative to the first block so that either of two tape-receiving tracks on the first block may be aligned with a single tape receiving track on the first block, means for rotating the support between a first tape winding position and a second tape splicing position, and a splicer for splicing abutting tape ends on the splicing block assembly when the support is in the second tape splicing position. The machine also includes motorized spindles for holding a reel of magnetic tape to loaded into cassettes and for rotating one of the hubs of a cassette in loading position so as to wind magnetic tape onto that hub. The machine is arranged so that it may be easily adapted for loading two different types of video cassettes.

41 Claims, 23 Drawing Figures

IN-CASSETTE LOADING MACHINE

This invention relates to machines for splicing and winding tapes and in particular to machines for loading a length of flexible information recording material into a cassette. While the invention was made to facilitate the loading of magnetic tape, other use tapes such as strips of photographic film may be loaded into cassettes with this invention.

BACKGROUND OF THE INVENTION

A variety of magnetic tape cassettes have been developed which employ two rotatable hubs or spools with magnetic tape connected to both hubs and wound upon one or both hubs. Usually the cassette includes sections of a leader tape attached to each spool or hub, with the magnetic tape having its opposite ends spliced to the two leaders. Cassettes of this type have been developed for both audio and video magnetic tape. Magnetic tape cassettes of the audio type are generally shown in U.S. Pat. Nos. 3,423,038, 3,753,835, 3,797,770, 3,167,267, and 4,062,719. Video cassettes are more complicated than audio cassettes and generally have a door which is normally closed to conceal the magnetic tape and leader. When the video tape cassette is to be used, the door is opened so as to allow the tape to be transported past the Read and Write magnetic heads of a VCR (video tape cassette recorder) machine.

Two types of VCR machines have achieved substantial commercial success. One type, known as the VHS format machine, uses a cassette having a pivoted door along one side, first releasable door locking means at a first side of the cassette body for keeping the door locked, and second releasable hub locking means for preventing rotation of the cassette hubs. The second type of commercially successful VCR machine, known as the Betamax format machine, uses a cassette which is similar to the VHS cassette but differs in size, has its door locking means located at the second or opposite side of the cassette, and has a hub locking mechanism which is unlocked with the door.

Cassettes loaded with a selected amount of magnetic tape are generally manufactured in one of two ways. The first way involves starting with two hubs with a length of leader tape secured to and extending between the two hubs, severing the leader tape into two sections, splicing magnetic tape to the leader section connected to a first one of the two hubs, winding a selected length of magnetic tape onto that first hub, splicing the trailing end of the magnetic tape to the leader section connected to the second hub, and then inserting the two hubs into a cassette body. This type of loading is commonly called "hub loading". The second common method is to load magnetic tape directly into a C-Zero cassette. A "C-Zero cassette" is one which consists of a cassette body, two hubs rotatably mounted in the cassette body, and a length of leader tape connecting the two hubs. This type of cassette loading, commonly called "in-cassette loading", also involves cutting the leader tape to form two discrete leaders, splicing one end of a magnetic tape to the leader connected to a first cassete hub, winding magnetic tape onto the first hub, and splicing the trailing end of the magnetic tape to the second leader section. Where in-cassette loading is the practice, the procedure further involves the additional step of slowly winding the trailing end of the magnetic tape into the cassette after the second splice has been made, so that the magnetic tape and the trailing leader are fully pulled into the cassette.

Heretofore, in-cassette loading of video tape cassettes has been hampered by the fact that the VHS and Betamax cassettes (a) have leaders which are relatively short as well as having different lengths, and (b) are of different size and employ different locking mechanisms. The relatively short leaders and the fact that the splicing tape must be applied to the inner surface of the leader when making a splice have restricted the design of the means used to extract the leader from the cassette and the means which support the leader during the splicing and winding operations. A further complication in the design of in-cassette video tape loading machines is that manufacturers of video cassettes may require that the length of the leader at one or both ends of the the magnetic tape be within certain prescribed limits. Also, because of the relatively high cost of video tape cassettes, manufacturers are quite concerned about the cosmetic appearance of the cassettes and are unwilling to utilize loading machines which may damage the exterior appearance of the cassette, provide uneven loading of magnetic tape, or damage the tape. As a result state of the art in-cassette video tape loading machines are capable of loading only one type of cassette and hence two different machines are required to be purchased for loading VHS and Betamax cassettes. Other limitations of state of the art in-cassette video tape loading machines are relatively low production rates, slow and complicated means for extracting the leader from a cassette and placing it in position to be cut and spliced to the magnetic tape which is to be loaded into the cassette, and difficulty in servicing the splicing device which applies adhesive splicing tape to the tapes to be spliced. Another problem associated with prior art loading machines is that the various tape-handling components are spread apart from one another to an extent that causes the machines to be relatively large and slow. State of the art in-cassette loading machines also are relatively expensive.

Still other disadvantages, problems and limitations of existing in-cassette video tape loading machines are well known to persons skilled in the art. Such disadvantages, problems and limitations have influenced some manufacturers of video tape cassettes to utilize hub loading machines even though such machines involve more manual labor.

SUMMARY OF THE INVENTION

The primary object of this invention is to provide a new and improved winding machine which avoids the foregoing drawbacks of prior in-cassette loading machines and features a new and improved splicing block assembly.

Another object of this invention is to provide a machine for splicing and winding tape into cassettes which is adapted to operate faster than current state of the art in-cassette video tape loading machines.

A further object is to provide a machine of the type described which is fully automatic, compact, capable of winding a use tape into cassettes without damage to the use tape, and adapted to operate faster than state of the art in-cassette video tape loading machines.

Another important object of the invention is to provide a video tape in-cassette loader which is arranged so that with some relatively quick and easy change of parts it may be set up to load tape directly into either of two different kinds of cassettes, e.g., into either Betamax or VHS cassettes.

A further specific object is to provide a new and improved splicing block assembly for permitting a flexible tape to be rapidly and precisely spliced to tape leaders connected to cassette hubs.

Still another specific object of the invention is to provide a machine having a splicer assembly which may be removed quickly and with little effort from its operating position so as to facilitate servicing or access to the splicing block assembly.

These and other objects are achieved by providing a machine having a panel, a splicing block assembly comprising first and second splicing blocks, a support for said blocks on said panel, means for pivoting one block relative to the other about a first axis fixed relative to the support, means for pivoting said support as a unit about a second axis fixed relative to the panel, a cassette feeder for feeding cassettes to a loading position adjacent to the splicing blocks for loading, means for holding a cassette in loading position and discharging the cassette after it has been loaded, and a splicer removably mounted to said panel in front of said splicer block assembly.

Other objects, features and advantages of the invention are described or render obvious in the following detailed specification which is to be considered together with the accompanying drawings wherein like numerals indicate like parts.

THE DRAWINGS

Figure 1:
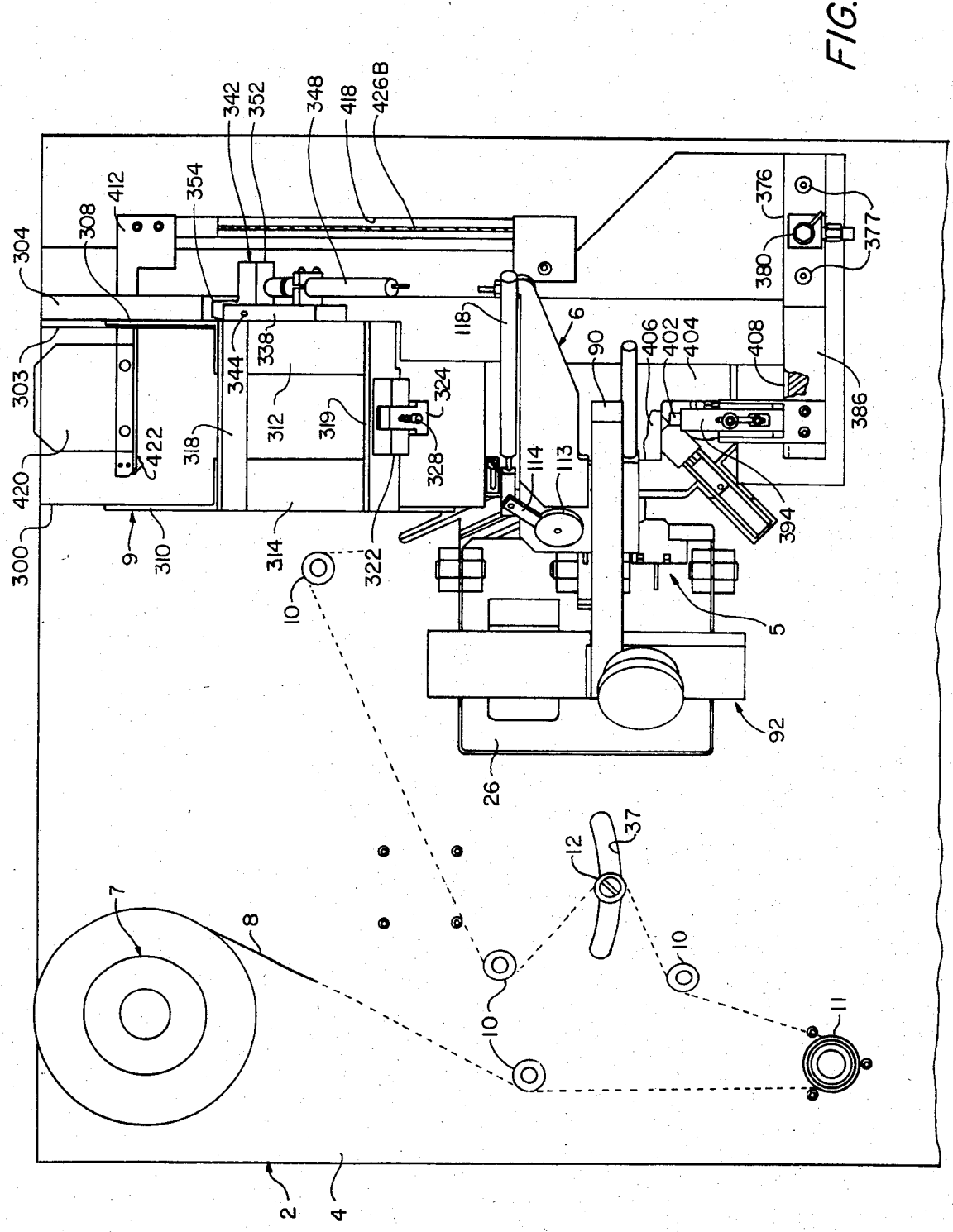
FIG. 1 is a front elevation of an in-cassette video loader which constitutes a preferred embodiment of the present invention adapted for loading VHS cassettes.
Figure 2:
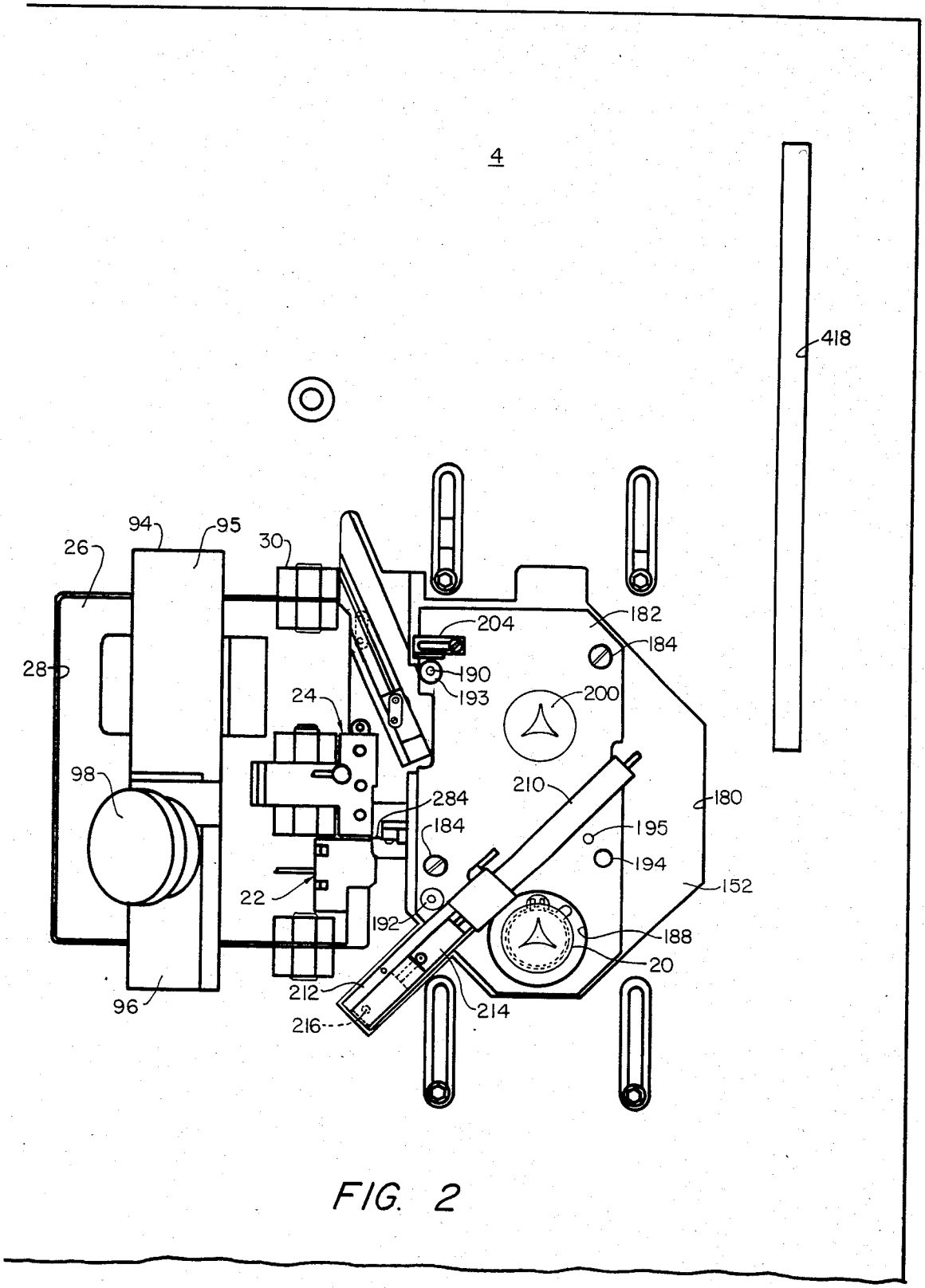
FIG. 2 is a front view in elevation of the same machine but with certain parts (such as the storage magazine and splicer) omitted so as to reveal details of the splicing block assembly and the leader extractor mechanisms.
Figure 15:
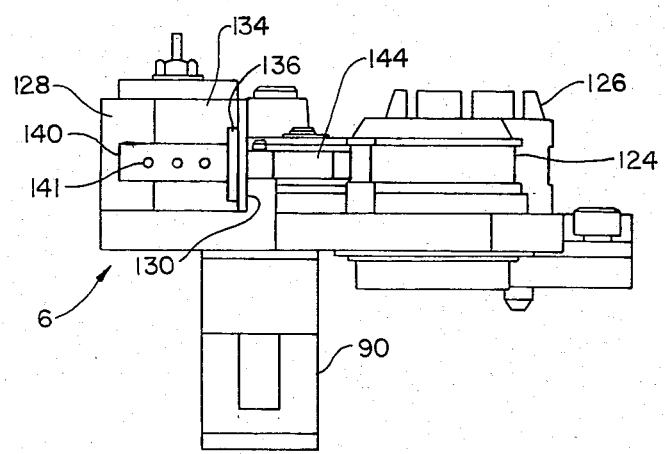
FIG. 15 is a end view of the same splicer.
Figure 16:
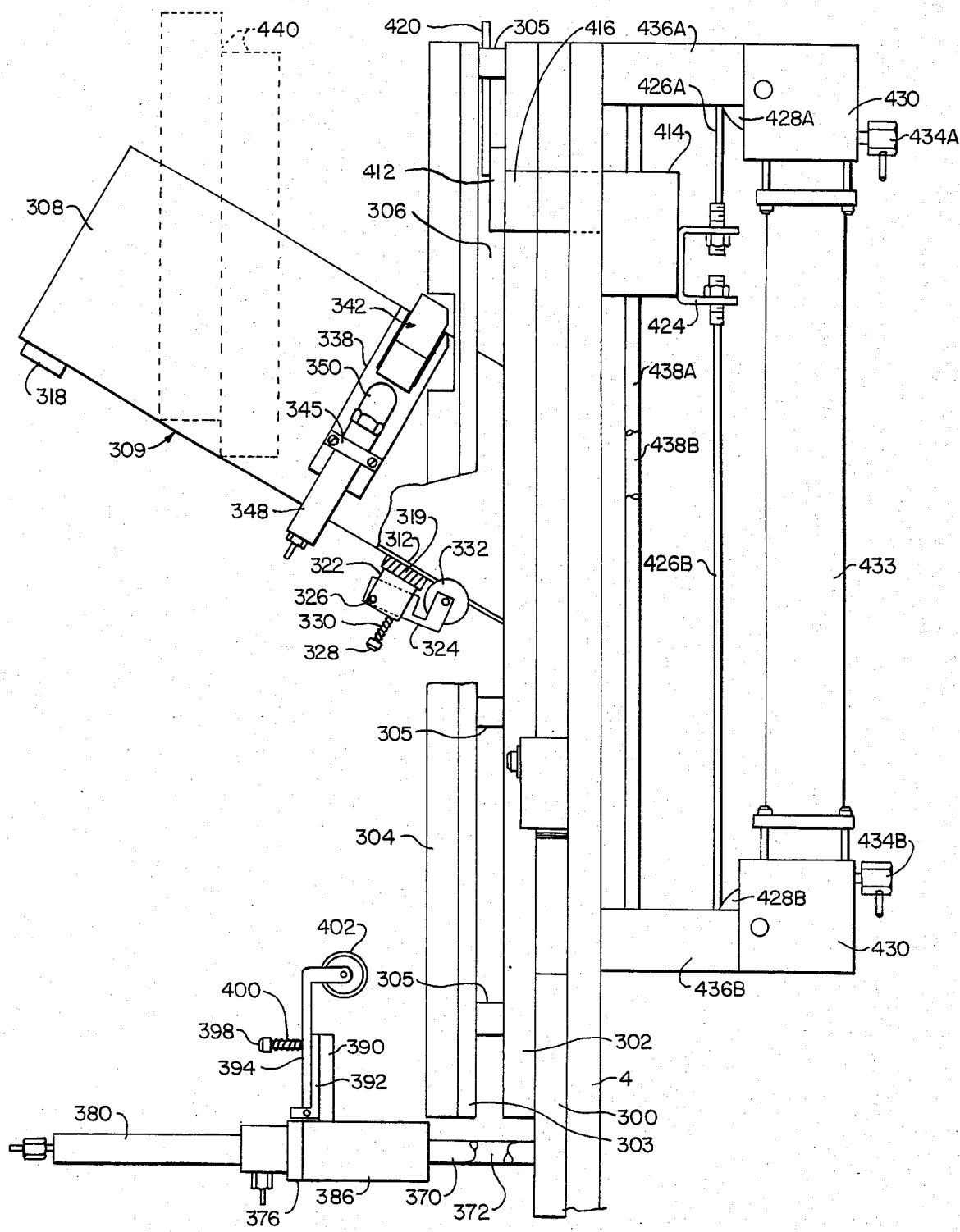
Figure 17:
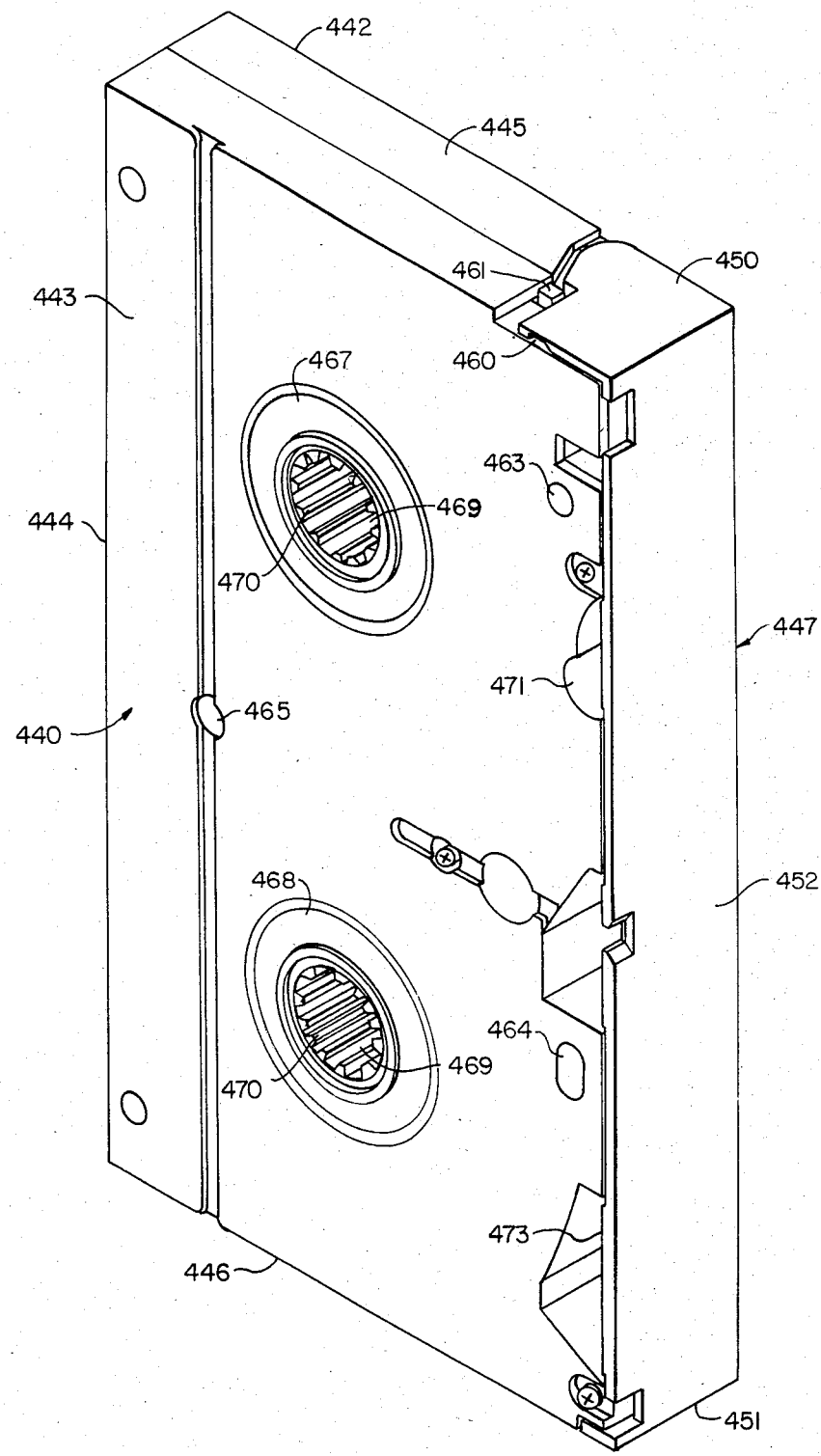
Figure 18:
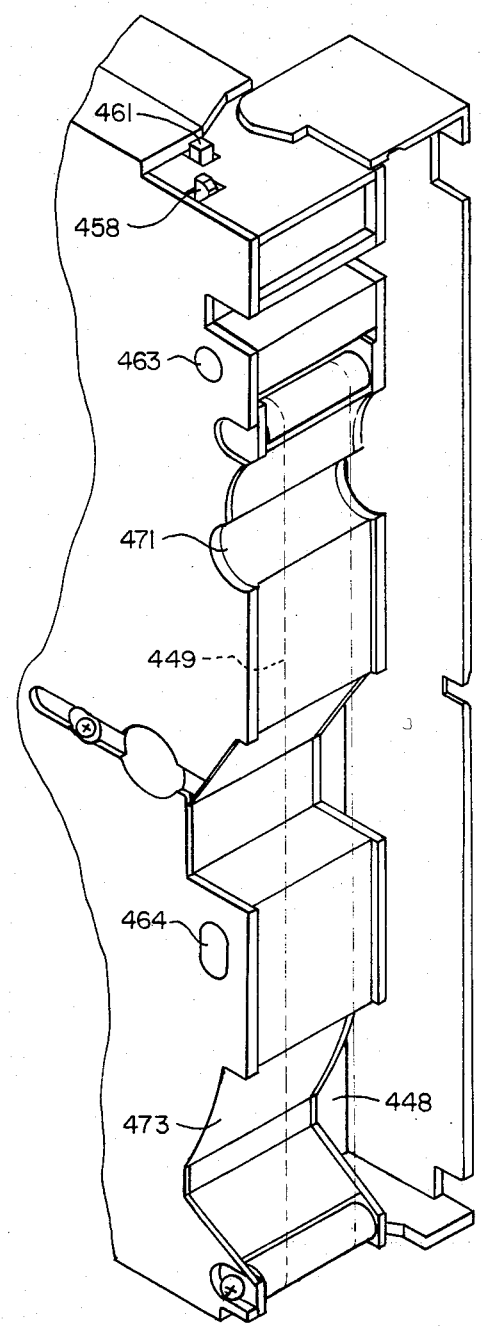
Figure 19:
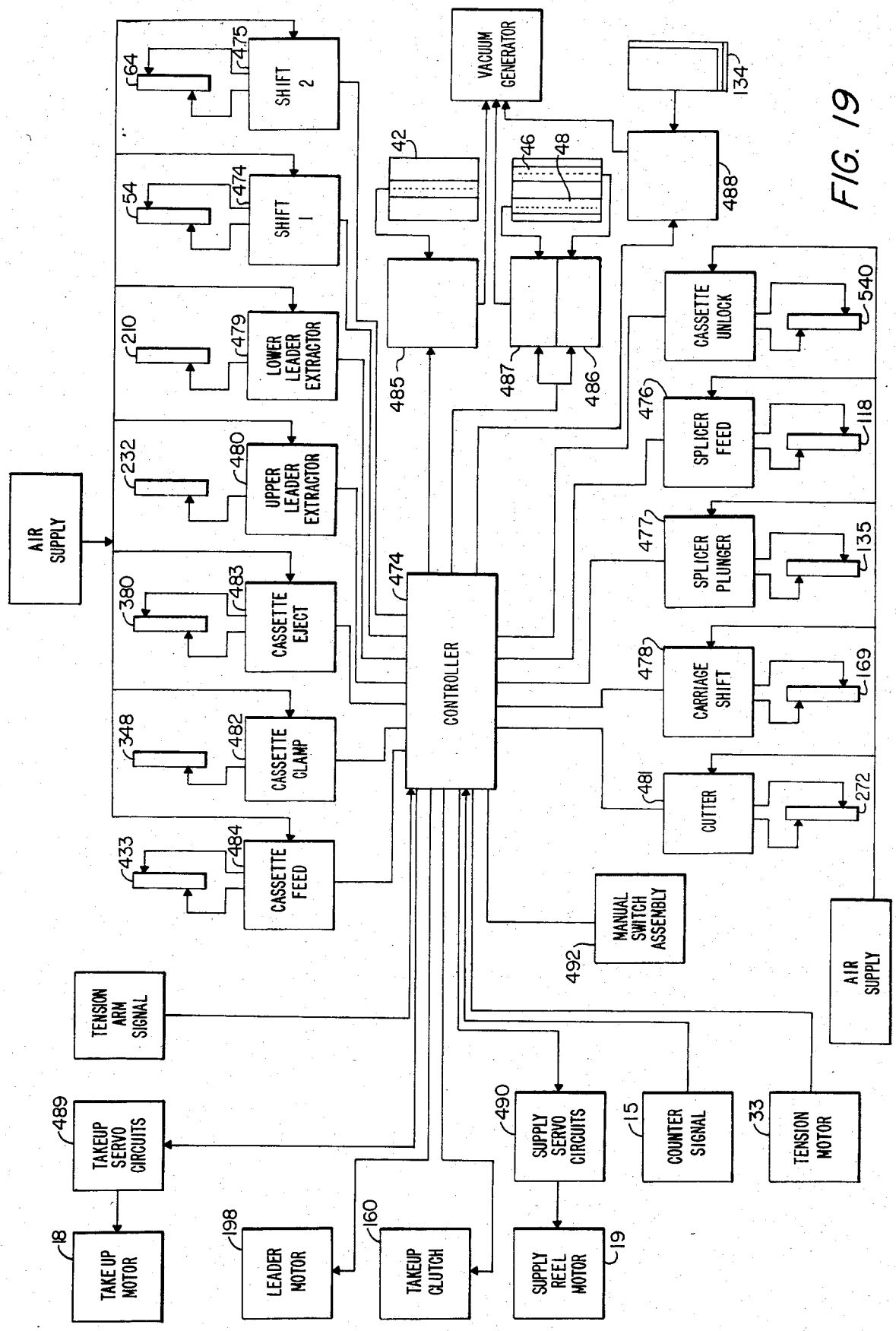
Figure 20:
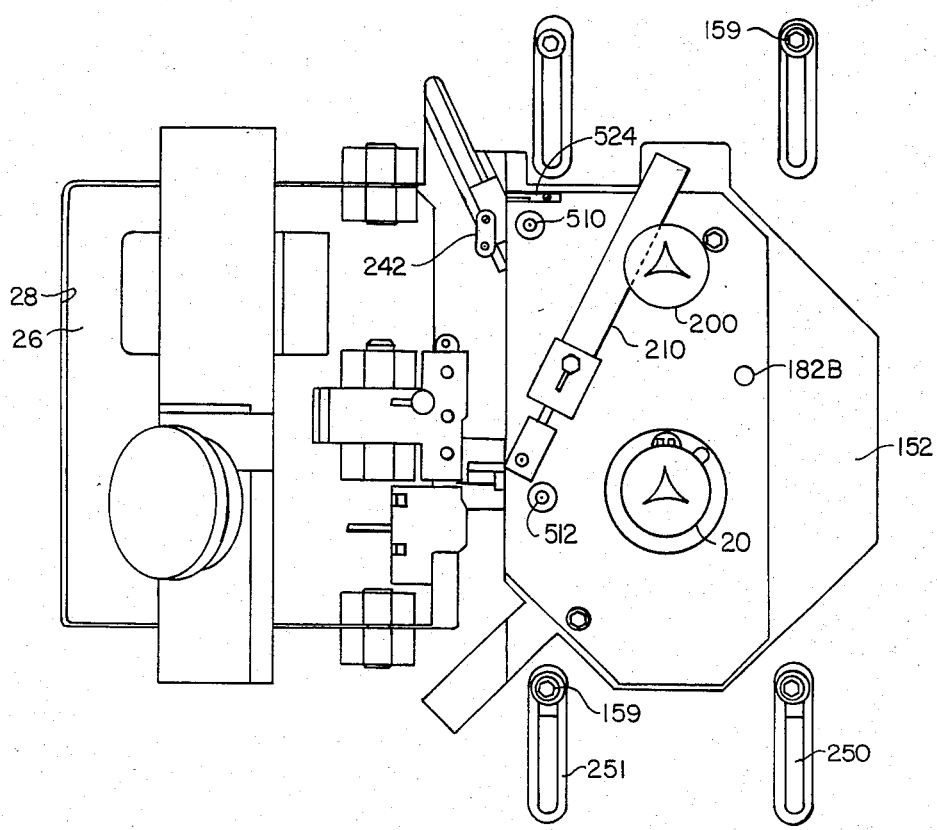
Figure 21:
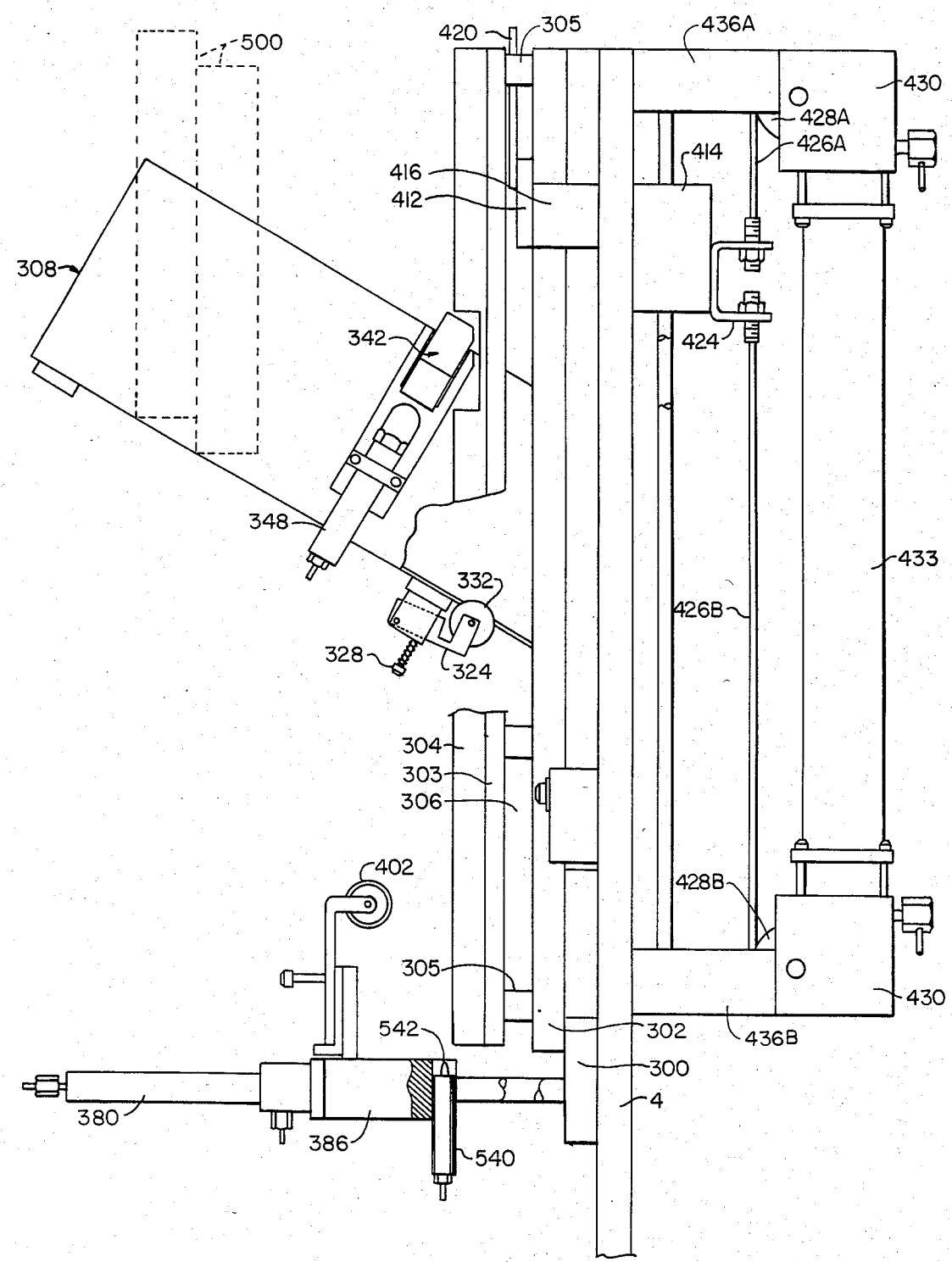
Figure 22:
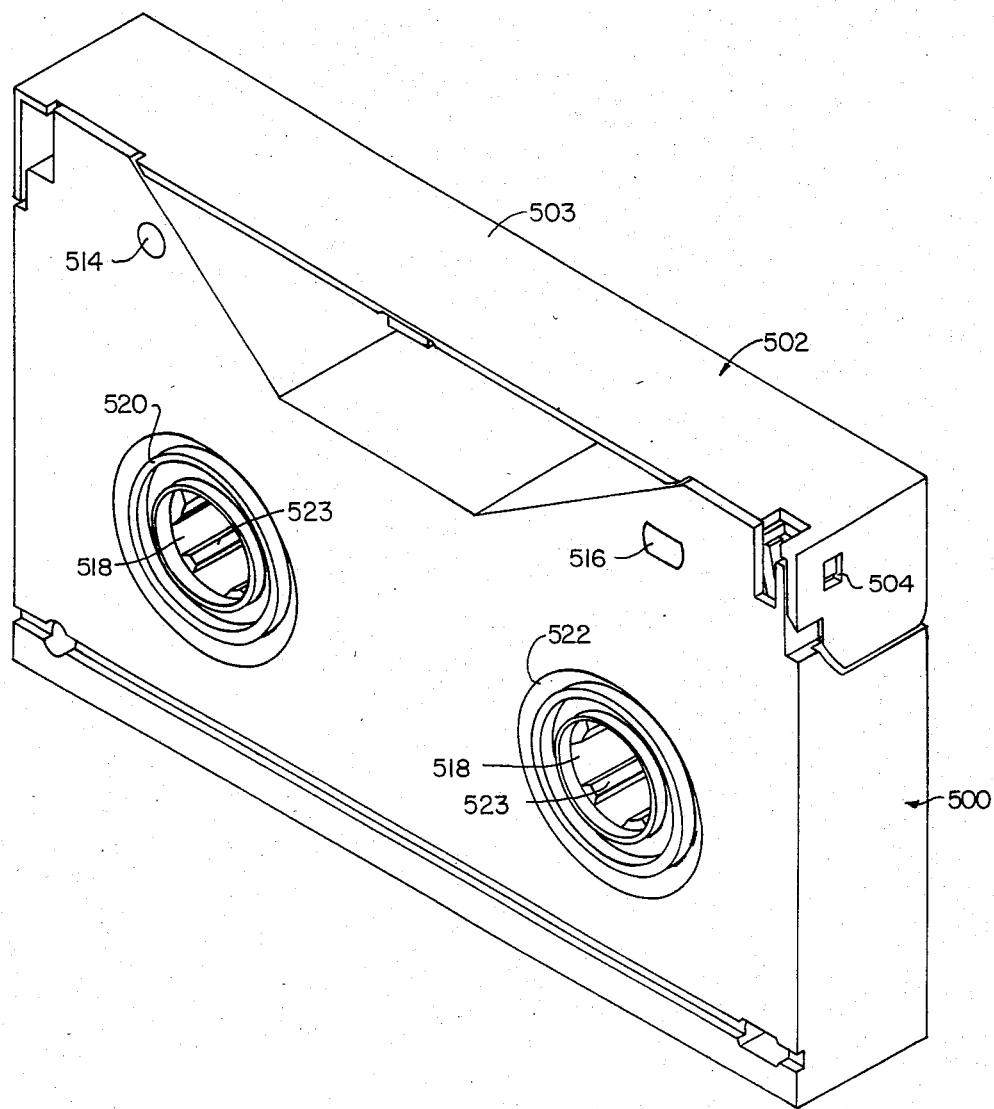
Figure 23:
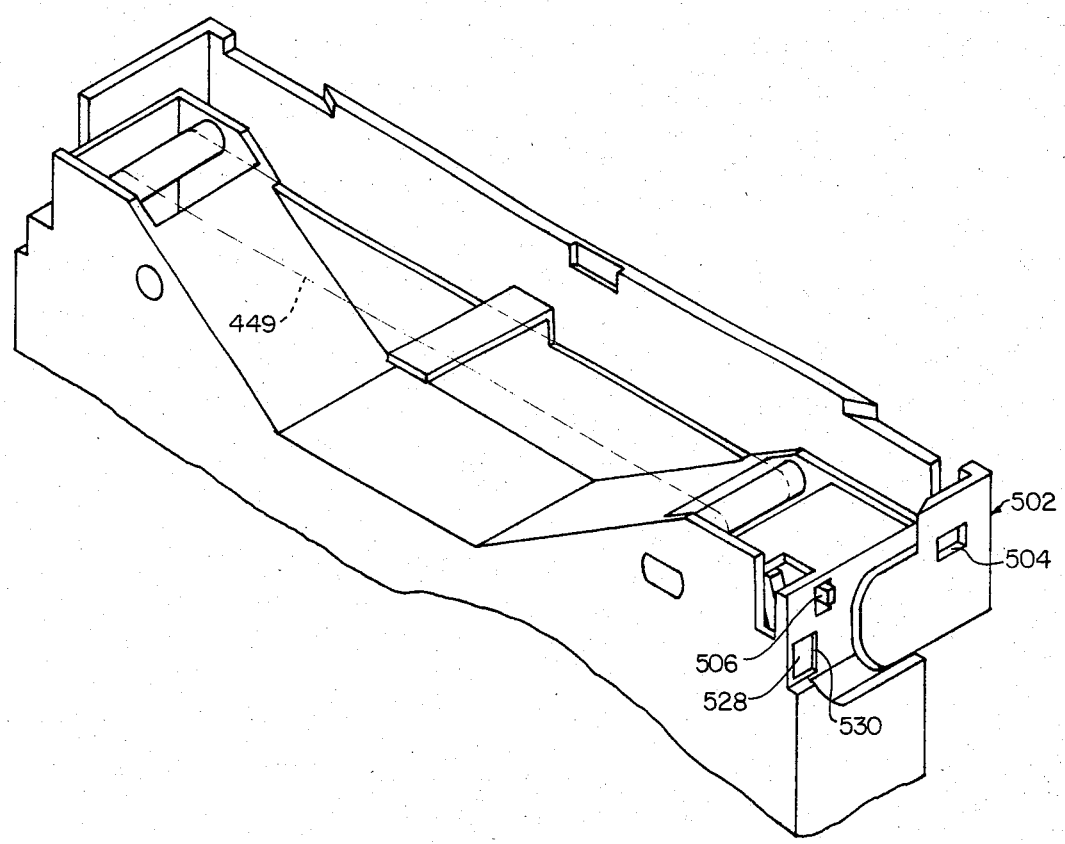

FIG. 16 if a fragmentary side view in elevation showing the cassette feeder and discharging mechanism employed when loading VHS cassettes;

FIG. 17 is a perspective view of the rear side of a VHS cassette with its door closed;

FIG. 18 is a fragmentary perspective view showing the same cassette with its door opened;

FIG. 19 is a schematic diagram of the control system for the machine of FIG. 1;

FIG. 20 is a view like FIG. 2 showing the Betamax adaptor plate;

FIG. 21 is a view like FIG. 15 showing the cassette feeder and discharging mechanism employed when loading Betamax cassettes; and FIGS. 22 and 23 are views like FIGS. 16 and 17 showing details of a Betamax cassette.

DETAILED DESCRIPTION OF THE INVENTION

Turning now to FIGS. 1 and 2, the illustrated machine is adapted for loading magnetic tape directly into C-Zero VHS cassettes. As disclosed hereinafter, the machine shown in FIGS. 1 and 2 may be adapted by the change of certain parts to provide in-cassette loading of Betamax cassettes. It also may be adapted for loading another type of use tape, e.g., a strip of photographic film.

Figure 3:
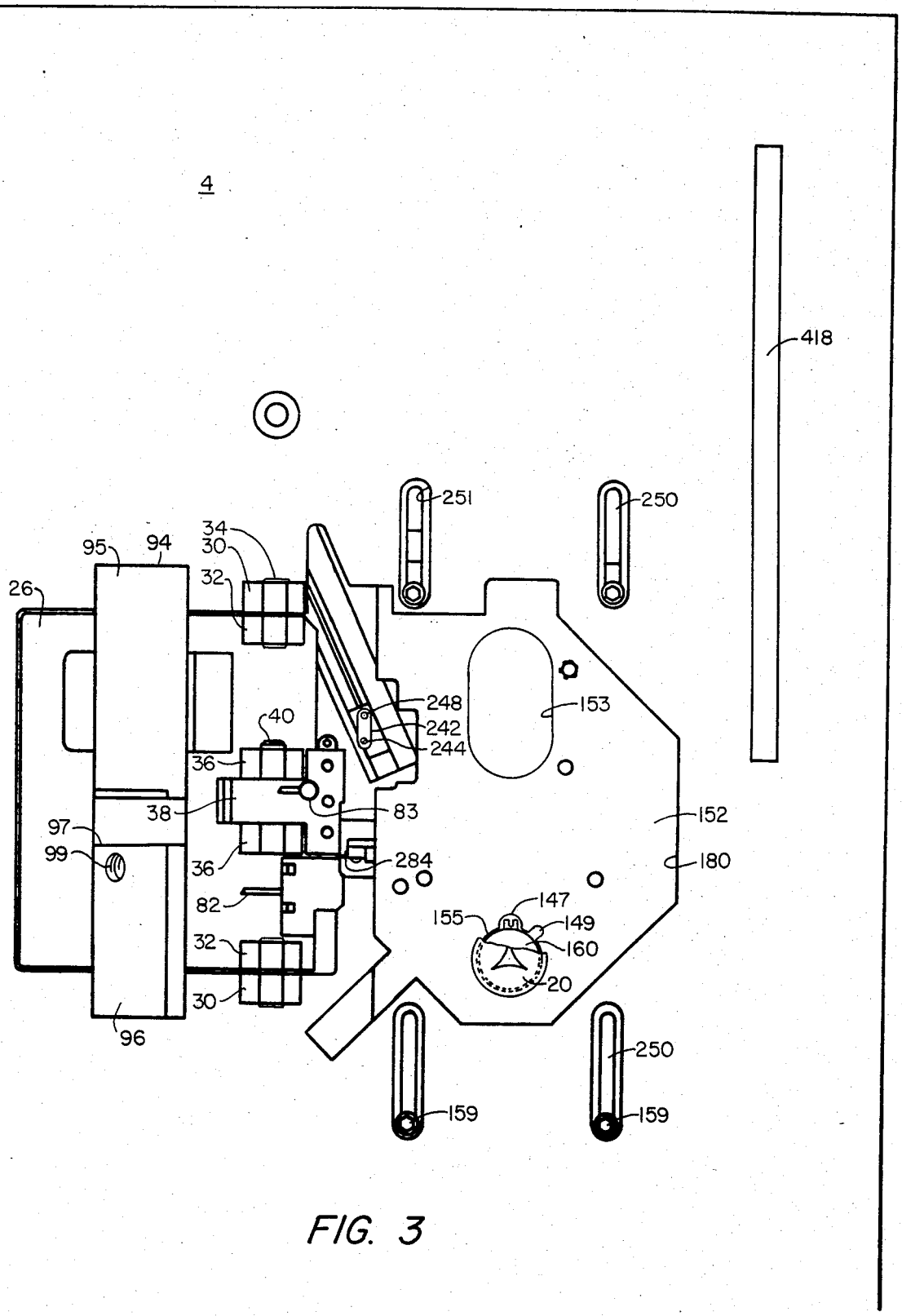
FIG. 3 is a view like FIG. 2 but with the VHS adapter plate removed.
Figure 4:
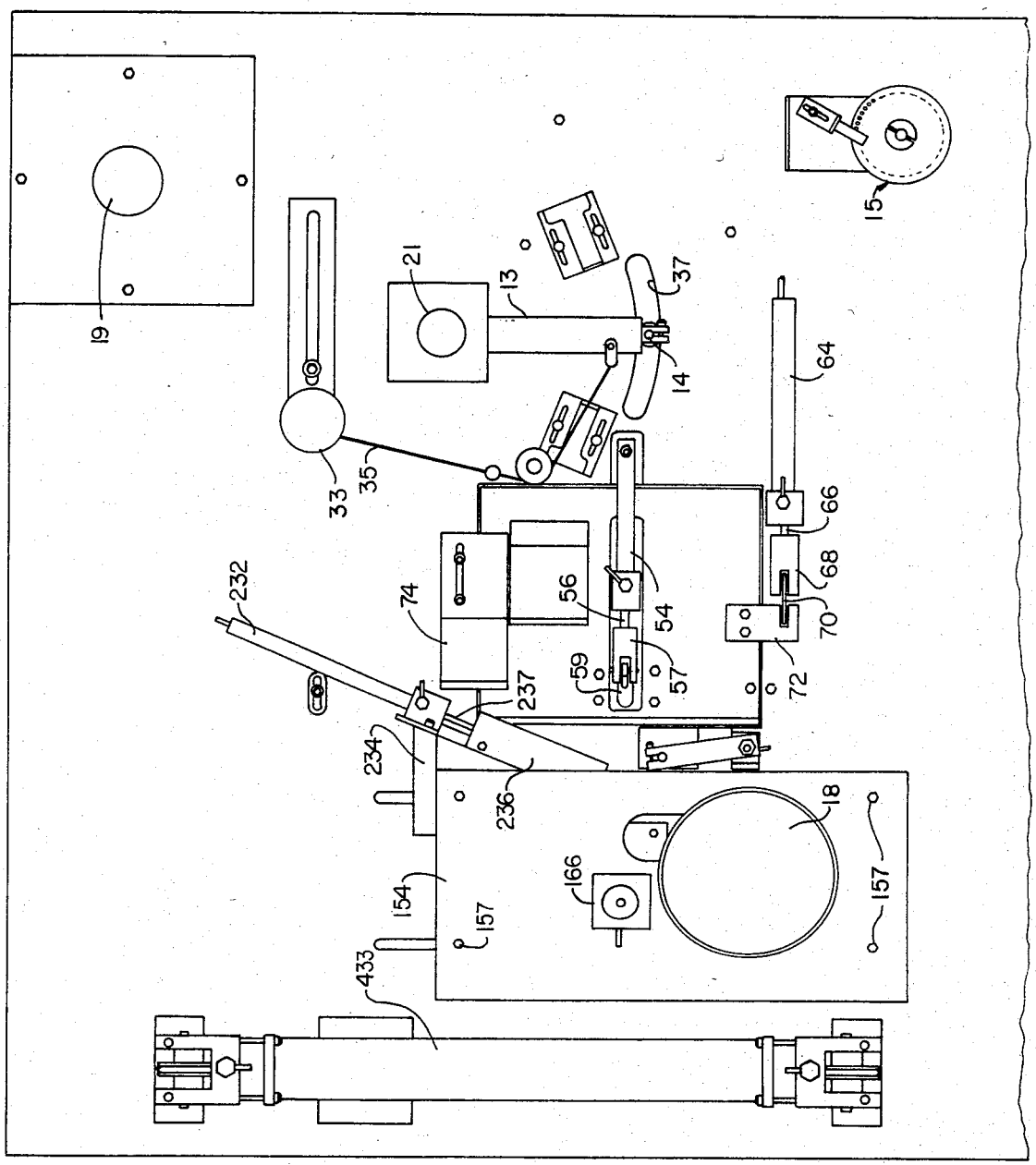
FIG. 4 is a vertical view in elevation of the rear panel of the same machine.

Turning now to FIGS. 1–3, the illustrated cassette tape splicing and winding machine comprises a console 2 having a front panel 4 which supports a splicing block assembly 5, an adhesive tape-dispensing splicer mechanism 6, a rotatable hub 7 for holding a reel of magnetic tape 8 that is used in filling cassettes, and a cassette storing and feeding mechanism 9. Also mounted on front panel 4 is a plurality of fixed guide rollers 10 and a counter wheel 11 which cooperate with a guide roller 12 mounted on a shaft 14 on a dancer arm 13 (FIG. 4) to determine the path of movement of tape 8 from hub 7 to the splicing block assembly. Counter wheel 11 forms part of an electrooptical transducer assembly 15 (FIG. 4) which generates tape footage-counting pulses. The transducer assembly 15 and counter wheel 11 are well known in the art and hence need not be described in detail (see U.S. Pat. No. 4,061,286).

Also referring to FIGS. 2-4, 10 and 11, the machine includes a carriage 16 which carries a servo motor 18 for driving a rotatable winding spindle 20 (FIG. 2) which is adapted to mate with and drive one of the hubs of a cassette (not shown) which is positioned in a selected loading position on the front of the machine by cassette feeder mechanism 9, and also a carriage support assembly 17. The machine also includes a servo motor 19 mounted on the rear side of panel 4 for driving the supply reel hub 7. Servo motor 18 is controlled by movement of dancer arm 13 in accordance with the invention described and claimed in U.S. patent application No. 290,417 of Joseph P. Deyesso et al for Tape Winding System, now U.S. Pat. No. 4,436,251. Shaft 14 extends through a curved slot 37 in panel 4 and arm 13 is connected to the operating shaft of a rotary potentiometer 21 mounted on the rear side of panel 4. Potentiometer 21 is connected into the control circuit of servo motor 18. Arm 13 is biased toward the splicing block assembly by a biasing mechanism comprising a small electric motor 33 and a string 35 which extends between the output shaft of motor 33 and arm 13. Motor 33 applies a predetermine pull on string 35 which is sufficient to move arm 13 to the right hand end (as seen in FIG. 1) of slot 37 when servo motors 18 and 19 are off. During operation of the machine the tension on tape 8 will vary and will cause arm 13 to move in accordance with the tension change. The output signal of potentiometer will vary with movement of arm 13.

Turning now to FIGS. 1–3 and 5–9, the splicing block assembly 5 comprises two splicing vertically spaced blocks 22 and 24. Both blocks are attached to a support plate 26 which is positioned in an aperture 28 formed in the front panel 4. Support plate 26 is pivotally mounted to front panel 4 by means of a pair of pivot lugs 30 (FIGS. 3 and 5) attached to the front panel, a second pair of pivot lugs 32 attached to the plate 26, and a pair of pivot studs 34 connecting each pair of adjacent lugs 30 and 32.

Splicing block 22 is affixed directly to plate 26 so that it and the plate move as a unit. However, splicing block 24 is pivotally mounted to plate 26. For this purpose plate 26 has a pair of spaced pivot lugs 36 (FIG. 3), splicing block 24 has a lateral extension 38 which fits between the lugs 36, and a pivot stud 40 extends through holes in lugs 36 and the extension 38 so as to pivotally attach the splicing block 24 to plate 26. For convenience, splicing blocks 22 and 24 are hereinafter referred to as the "stationary" and "movable" splicing blocks, but it is to be understood that those terms are employed only to designate which of those members is movable with respect to support plate 26.

Figure 5:
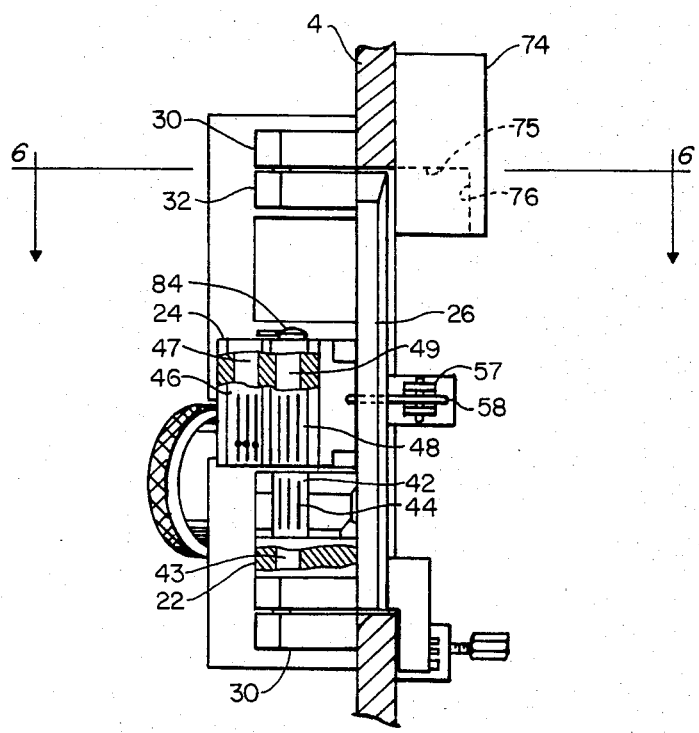
FIG. 5 is a vertical sectional view taken along line 5—5 of FIG. 3 showing the splicing block assembly and the support for said assembly each in a first position and with certain portions of the two splicing blocks broken away to illustrate the internal suction chambers associated with the three tape-accomodating tracks.
Figure 6:
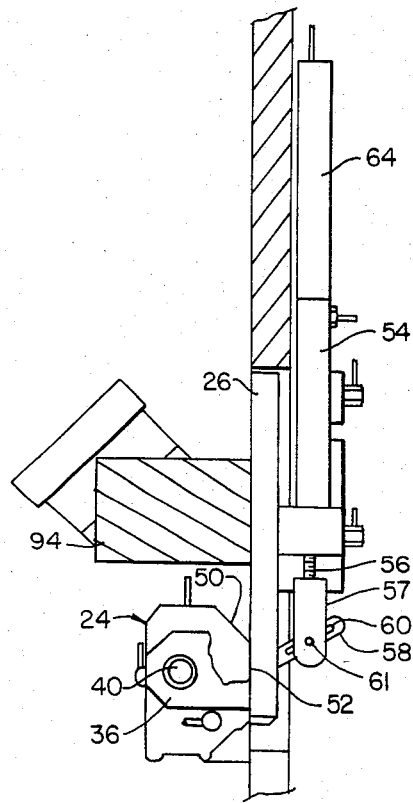
FIG. 6 is a horizontal sectional view taken along line 6—6 of FIG. 5 showing the splicing block assembly support in a first position and the mechanism for rotating the movable block of the splicing block assembly.
Figure 7:
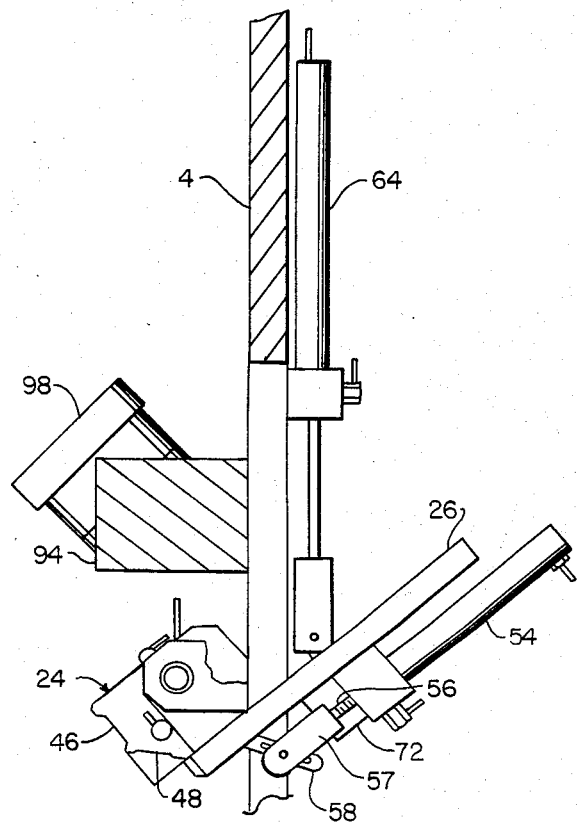
FIG. 7 is a view like FIG. 6 but with the splicing block assembly support in a second position.
Figure 8:
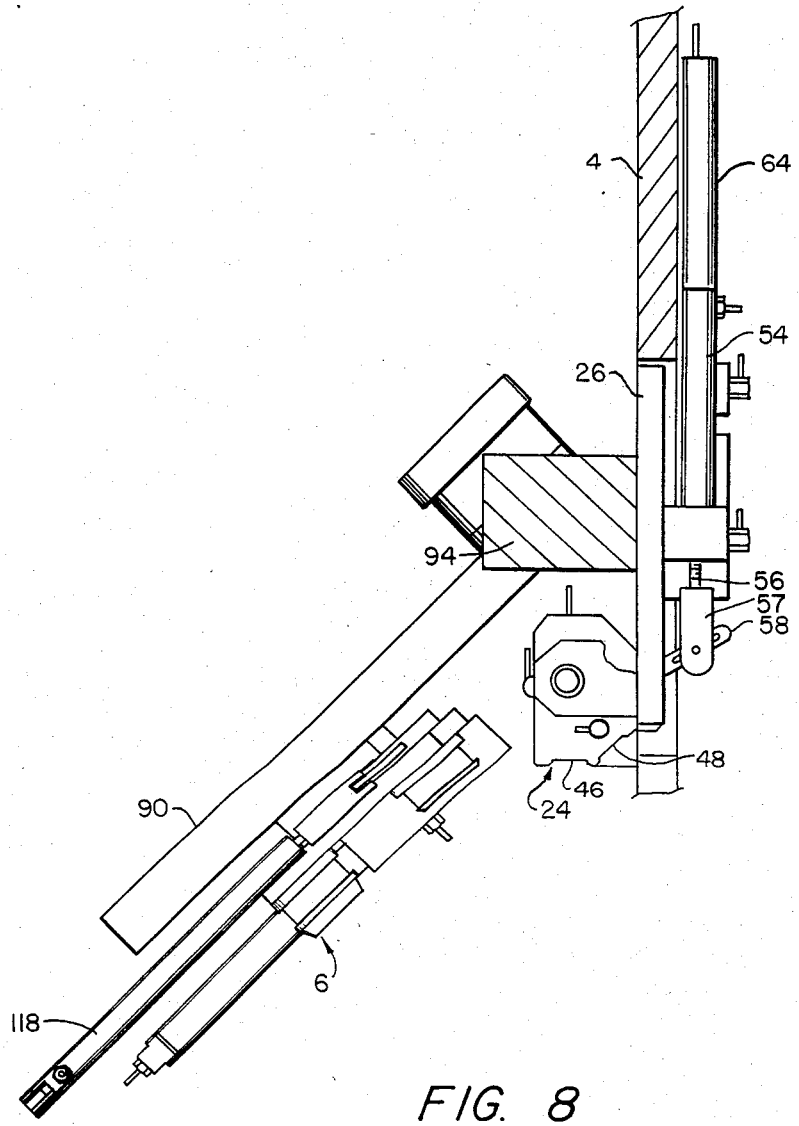
FIG. 8 is a view like FIG. 6 but showing the splicer disposed in its holder.

As seen in FIGS. 5 and 9–11, stationary splicing block 22 has a single track 42 to accommodate a leader or use tape. Additionally block 22 is hollow so as to define a suction chamber 43 (FIG. 5). The bottom surface of the track 32 is provided with a plurality of elongated apertures 44 which communicate via suction chamber 43 with a suction source so that suction may be applied to hold tape in track 42. Movable splicing block 24 has two tracks 46 and 48 which are identical in width and depth to track 42. Tracks 46 and 48 extend parallel to one another and also to track 42. Block 24 has two interior suction chambers 47 and 49 and tracks 46 and 48 also are provided with elongated apertures 44 which communicate via chambers 47 and 49 with separate suction sources so that suction may be applied selectively to hold tapes in those tracks. As seen in FIGS. 5–10, tracks 46 and 48 are arranged at an angle of approximately 30° to one another. Additionally, as shown in FIGS. 6–8, splicing block 24 is prismatic in cross-section, having two flat surfaces 50 and 52 which also extend at an angle to one another. The surfaces 50 and 52 are arranged so that when splicing block 24 is rotated on its pivot 40, its rotatational travel is limited by engagement of either surface 50 or surface 52 with the front surface of plate 26. When surface 52 engages plate 26, track 46 is in exact alignment with the track 42 of splicing block 22, and when surface 50 engages the plate 26, track 48 is in exact alignment with track 42 and the flat bottom of track 46 will be displaced 30° from the bottom surface of track 42.

Rotation of the splicing block 24 relative to support plate 26 is controlled by means of a pneumatic actuator 54 affixed to the rear side of plate 26. It is to be noted that a number of actuators are used in the illustrated embodiment of the invention. While electric solenoid, hydraulic or pneumatic type actuators may be used in this invention, pneumatic actuators, each comprising a cylinder and a movable piston/piston rod assembly, are preferred and that type of actuator is used in the illustrated embodiment of the invention. Such pneumatic actuators may be of the single-acting type wherein the piston/piston rod assembly is spring biased in one direction and driven in the opposite direction by application of high pressure air, or of the double-acting type wherein pressurized air is applied selectively at one or the other end of the cylinder to cause movement of the piston/piston rod assembly in one direction or in the opposite direction. The type of actuator used is a matter of choice.

In this case the piston rod 56 (FIGS. 4 and 6–8) of actuator 54 is attached to a bifurcated yoke 57. The latter is pivotally connected to an arm 58 which is affixed to splicing block 24. Arm 58 extends through an elongate opening 59 (FIG. 4) in plate 26 and has an elongated slot 60 (FIG. 6) to accommodate a pivot pin 61 anchored in yoke 57. The arm 58 extends through a slot 63 in the yoke 57 and is captivated by pivot pin 61. Because of the shape of slot 60, arm 58 can pivot and also move longitudinally relative to pivot pin 61. Consequently when the actuator 54 is operated so as to extend its piston rod 56, yoke 57 will cause arm 58 to swing in an arc, with the result that the splicing block 24 is rotated on its pivot so as to bring the track 48 into alignment with the track 42. When the piston rod 56 is retracted, the splicing block 24 pivots back until its surface 52 again engages plate 26, placing track 46 in alignment with track 42.

Figure 9:
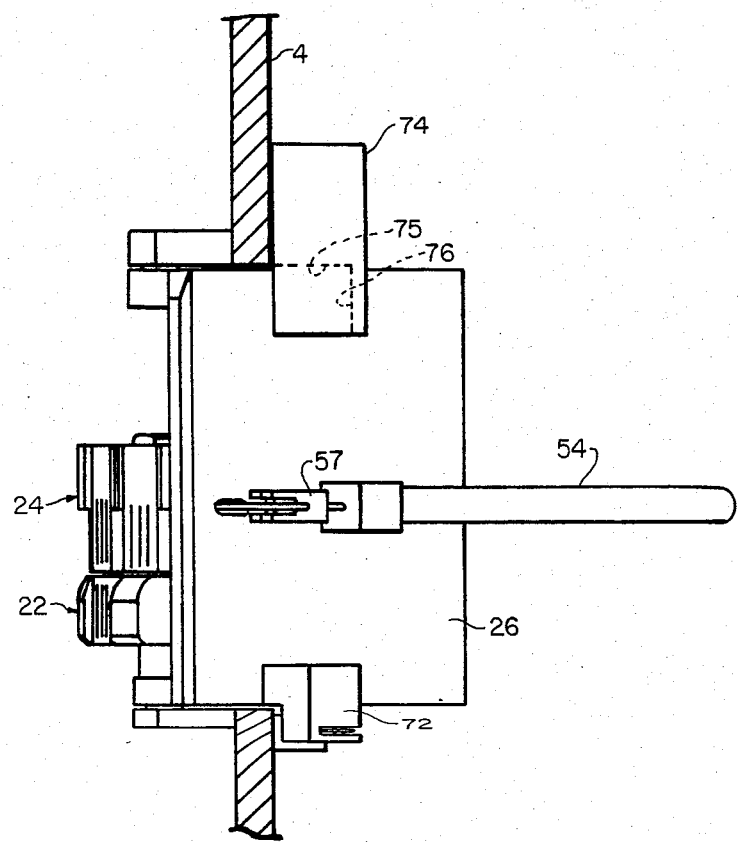
FIG. 9 is a vertical sectional view like FIG. 5 but showing the splicing block assembly support in a second position.

Referring now to FIGS. 2–9, the normal or at-rest position of support plate 26 is when it is co-planar with panel 4. During operation of the machine, plate 26 is pivoted through an angle of about 50° so as to align track 42 of stationary block 22 with splicer 6. Pivotal movement of plate 26 is accomplished by means of an actuator 64 which has its cylinder attached to the rear side of panel 4 and has a yoke 68 affixed to its piston rod 66. A link 70 has one end pivotally connected to yoke 68 and its other end pivotally attached to an L-shaped bracket 72 bolted to the rear side of plate 26. When piston rod 66 is retracted, plate 26 is flush with panel 4. When piston rod 66 is extended, plate 26 is pivoted to an angle of 50° relative to panel 4. When plate 26 is pivoted by retraction of piston rod 66, plate 26 is stopped when it is flush, i.e., co-planar with panel 4, by its engagement with splicer holding assembly member 94 hereinafter described. A mechanical stop 74 on the rear side of panel 4 stops movement of plate 26 when it is at an angle of 50° relative to panel 4, in which position it is is parallel with the support arm 90 of splicer 6. More precisely, as shown in FIGS. 5 and 9, mechanical stop 74 has a recess 75 characterized by a vertical surface 76 which extends at an angle of 50° to panel 4. Stop member 74 is located so tht plate 26 engages and is stopped by surface 76 when the piston rod 66 of actuator 64 is extended. When plate 26 is swung to its angular position by extension of actuator 64, track 42 of splicing block 22 will be in coplanar alignment with the plunger 134 hereinafter described of the splicer mechanism 6. At the same time, depending upon whether or not the actuator 54 is retracted or extended, either the track 46 or the track 48 will be aligned with the track 42.

Referring now to FIG. 3, stationary splicing block 22 is provided with a fitting 82 whereby its suction chamber 43 may be connected by a hose (not shown) to a suitable source of vacuum (not shown) located behind the front panel 4. Similarly, as shown in FIGS. 3 and 5, splicing block 24 has two hose fittings 83 and 84 whereby suction chambers 47 and 49 respectively are connected by suitable hose lines (not shown) to sources of vacuum (also not shown) located behind the front panel 4. The provision of suction chambers connecting through apertures in tape guiding tracks is old and well known in the art, as illustrated by U.S. Pat. Nos. 3,737,358 and 4,062,719 and other patents therein mentioned.

Referring now to FIGS. 1–3, 6–8 and 10–11, splicer 6 is attached to a supporting arm in the form of an elongated bar 90 which is releasably coupled to the machine by means of a splicer holding assembly 92 which comprises a block 94 (FIG. 2) secured to the front side of panel 4. Block 94 comprises an upper section having a front surface 95 that extends parallel to panel 4 and a lower section having a front surface 96 that extends at an angle of 50° relative to panel 4. The lower section of block 94 has a slot or groove 97 cut into its surface 96. Slot 97 has upper, lower and back sides defined by right angled flat surfaces and it front side is open. Slot 97 extends at an angle of 50° to panel 4. A large thumb screw 98 is screwed into a threaded hole 99 (FIG. 3) in block 94 and is arranged so that the underside of its head engages the bar 90 and holds it tight within the groove 97 so as to keep the splicer 6 in a fixed position.

Except for the manner in which it is mounted to the machine so as to be easily removable, the splicer forms no part of the present invention. Moreover various forms of splicers may be used with the present invention. Accordingly, the splicer shown in the drawings is described herein only to the extent required to understand the operation of the present invention.

It is preferred to use a conventional splicer of the type shown in the drawings which is generally the same as the splicer shown in U.S. Pat. Nos. 4,364,791 of David Kincheloe and 3,753,835 James L. King.

As seen in FIGS. 1, 8, 14 and 15, the splicer has a back plate 110 and mounted on the back plate is a one-way clutch mechanism 113 (FIG. 1) having an operating arm 114. Operating arm 114 is pivotally attached to the end of the piston rod 117 of a pneumatic actuator 118 which is secured to a plate 111 attached to plate 110. Actuator 118 normally has its piston rod in the retracted position shown in FIGS. 1 and 14. Each time actuator 118 is pressurized with air via a hose fitting 120 (FIG. 14), the arm 114 is caused to move through arc of predetermined length. Rotation of arm 114 by extension of piston rod 117 causes clutch 113 to operate a ratchet gear 112 on the front side of plate 110 which is coaxially coupled to clutch 113 and a feed wheel 124. The latter is adapted to feed an adhesive splicing tape from a supply roll (not shown) mounted on a hub 126 into position where it may be cut and applied to two tapes which are to be spliced.

Figure 14:
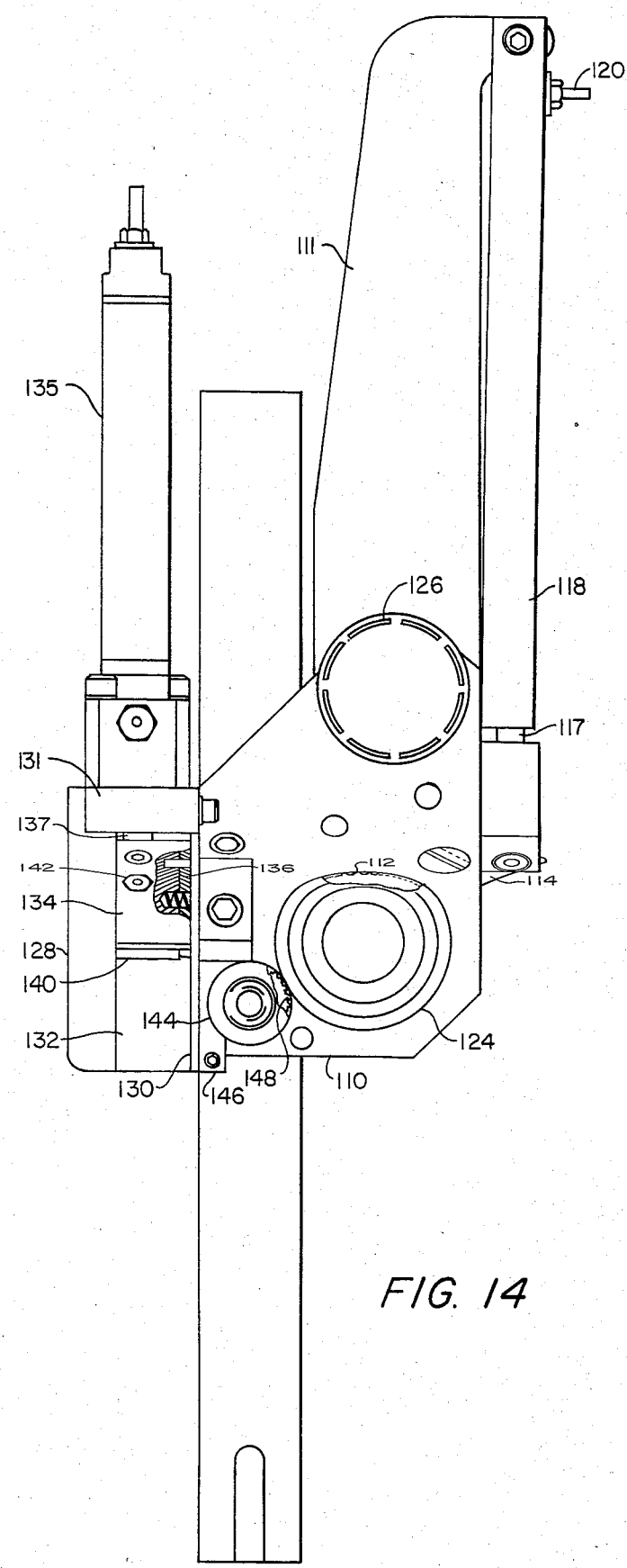
FIG. 14 is a side view in elevation showing details of the splicer mechanism.

As seen in FIGS. 14 and 15, the splicer has a pair of parallel members 128 and 130 and a header plate 131 attached to plate 110 and defining a channel 132 in which is mounted a reciprocal hollow plunger 134. The plunger is attached to the piston rod 137 of a pneumatic actuator 135 which is mounted to plate 131. Attached to the side of the plunger is a cutter blade 136 (FIG. 14) which reciprocates with the plunger. The bottom side of the plunger has a resilient pad 140 provided with openings 141 which communicate with openings (not shown) in the bottom side of the plunger, whereby suction may be applied to hold a piece of splicing tape to the pad. Vacuum is applied to the interior of the plunger and to the apertures in pad 140 through a hose fitting 142 which is mounted to the plunger and is used to connect the splicer plunger to a source of vacuum.

The parallel member 130 has an aperture (not shown) through which splicing tape from the supply roll mounted on hub 126 is fed into channel 132. Feeding of the splicing tape is achieved by coaction of feed wheel 124 and a smaller feed wheel 144, plus a guide member 146 known as a "picker" which guides the free end of the splicing tape through the aperture in member 130 underneath plunger 134. A small 148 coupled to feed wheel 144 meshes with gear 112, so that feed wheel 144 rotates with feed wheel 124 when actuator 118 is extended. Hence each time arm 114 is operated by extension of actuator 118, a length of splicing tape is advanced beneath the plunger 134 by wheels 124 and 144 (no advancement of splicing tape occurs when the piston rod of actuator 118 is retracted due to the one-way action of clutch 113). Additionally each time actuator 135 is operated, plunger 134 is moved along channel 132 far enough for cutter blade 136 to cut a piece of splicing tape extending beneath pad 140 from the remaining portion of the splicing tape. The cut piece of splicing tape will adhere to the pad by suction until the pad deposits it on the splicing blocks 22 and 24 to effect splicing between a leader and a section of magnetic tape held by those blocks. The vacuum applied through the apertures 141 of pad 140 is terminated as the pad presses the splicing tape into contact with the two tapes to be spliced, so that when the plunger moves back to its original retracted position, the splicing tape will tend to stay with the spliced tapes rather than adhere to the resilient pad.

Turning now to FIGS. 2–4 and 10–12, the carriage 16 for motor 18 and tape winding spindle 20 comprises a carriage plate 152 and the carriage support assembly 17 comprises a plate 154 which is secured behind and parallel to the front panel 4 by means of four elongated rods 156, screws 157 (FIGS. 4, 10 and 11) and screws 159 (FIGS. 2 and 3). Screws 157 and 159 are screwed into threaded holes in the rear and front ends respectively of rod 156. Carriage plate 152 has four bushing assemblies 158 attached to its four corners. These bushing assemblies are mounted on and make a smooth sliding connection with rods 156 so that the carriage plate can move smoothly between plate 154 and front panel 4.

Carriage plate 152 has two apertures 153 and 155. Aperture 153 is vertically elongated and aperture 155 has two radial extension slots 147 and 149. Servo motor 18 is affixed to the rear side of carriage plate 152 so as to move with plate 152 as it moves along rods 156. Motor 18 is provided with an output shaft to which is connected an electromagnetic clutch 160. Preferably clutch 160 is a type SL (shaft mounted) electromagnetic friction clutch having a housing 161 containing the field coil, a rotor 162 having a hub 163 secured to the output shaft 23 of motor 18, and an armature assembly 164 having a hub 165 on which is affixed wind spindle 20. Wind spindle 20 has a front end shaped so that it will easily enter the depression on the rear side of the lower hub of a VHS cassette in loading position and cause the hub to rotate with it. The field coil housing 161 surrounds and is rotatably mounted to rotor hub 163, and hub 165 of armature assembly 164 is rotatably mounted on the output shaft of motor 18. The head of a screw 167 screwed into a tapped hole in the end of shaft 23 holds armature assembly 164 on shaft 23. Housing 161 has a radial projection 166 which is used to lock it against rotation. Hence with housing 161 locked against rotation, so long as the field coil is deenergized, armature assembly 164 and rotor 162 will be rotatable relative to one another, so that if motor 18 is energized while the field coil is deenergized, the rotor will turn with output shaft 23 but spindle 20 will not rotate. However, if the field coil is energized, the resulting magnetic field will force the armature to frictionally engage the rotor, with the result that the armature and rotor will be clutched together. Hence, if motor 18 is energized at the same time as the clutch field coil, spindle 20 will be driven by motor 18. The machine's control system (hereinafter described) is arranged so that clutch 160 and motor 18 are deenergized and energized at the same time.

The radial extension slot 147 of carriage plate 152 receives the radial projection 166 of housing 161, whereby plate 152 locks housing 161 against rotation. The radial extension 149 of carriage plate 152 accommodates the electrical leads (not shown) for motor 18.

Figure 10:
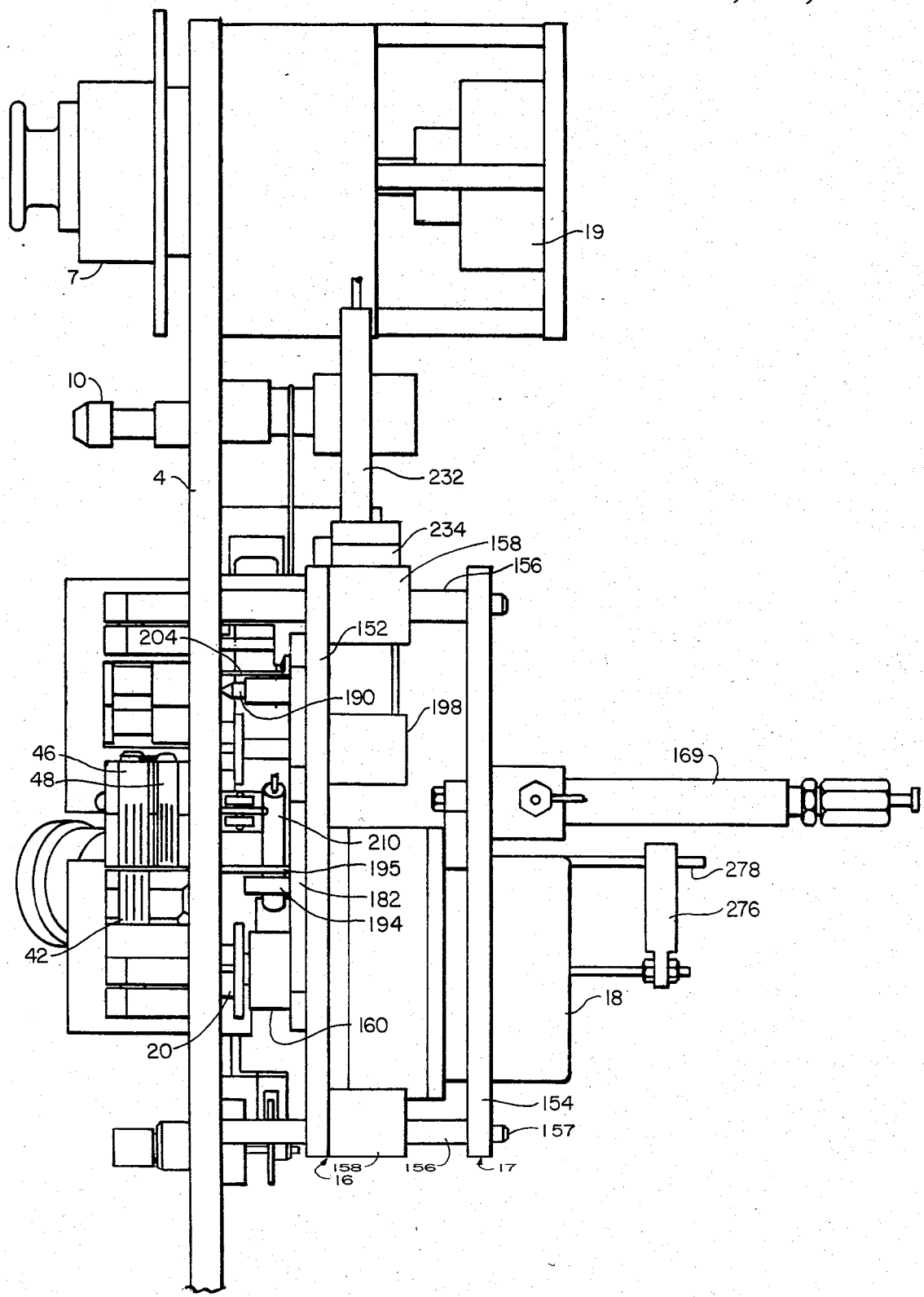
FIGS. 10 and 11 are side views in elevation of the front panel of the machine, with the cassette feeder mechanism omitted, showing the carriage for the tape winding spindle in its back (retracted) and forward (extended) positions respectively.
Figure 11:
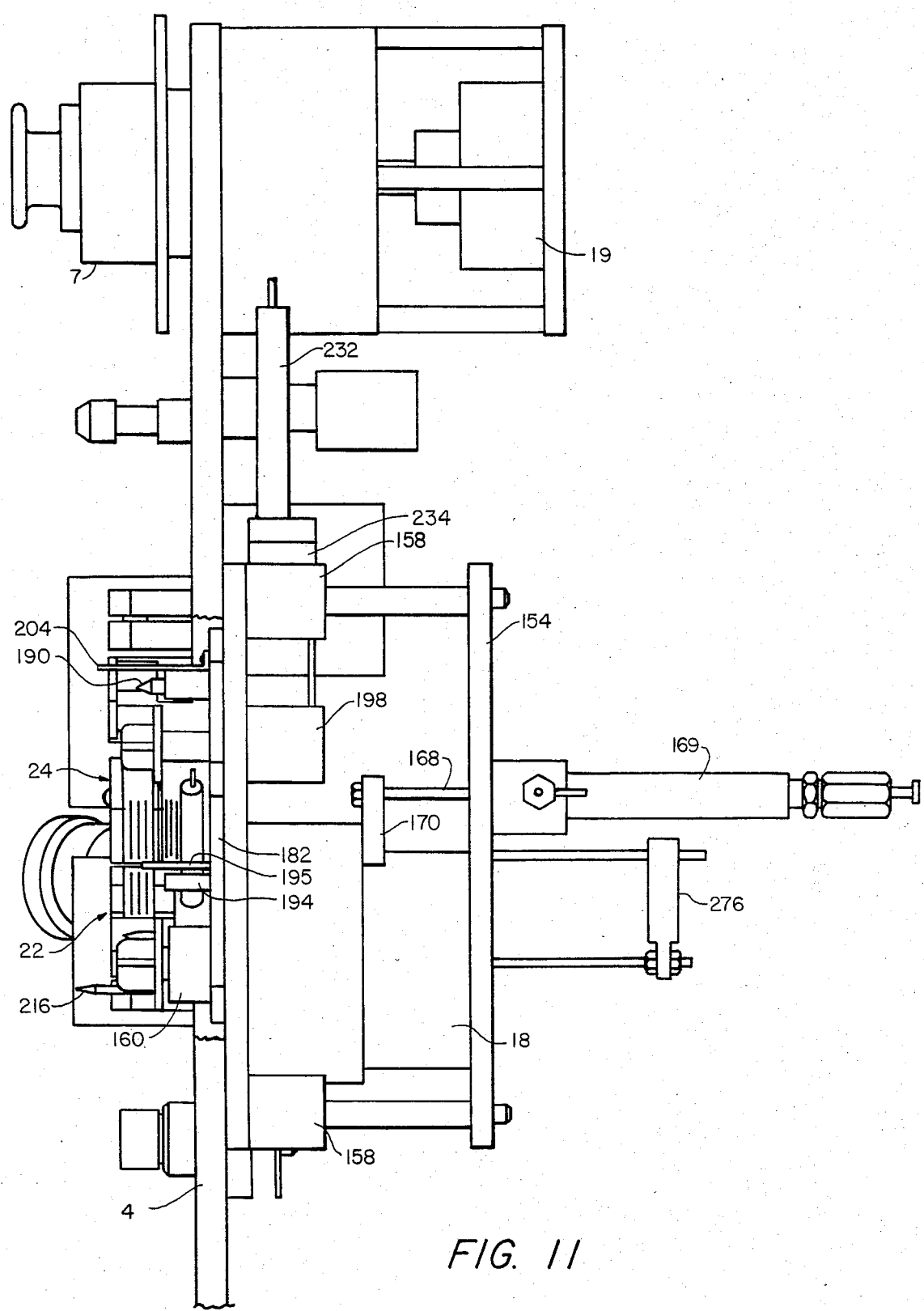
Figure 12:
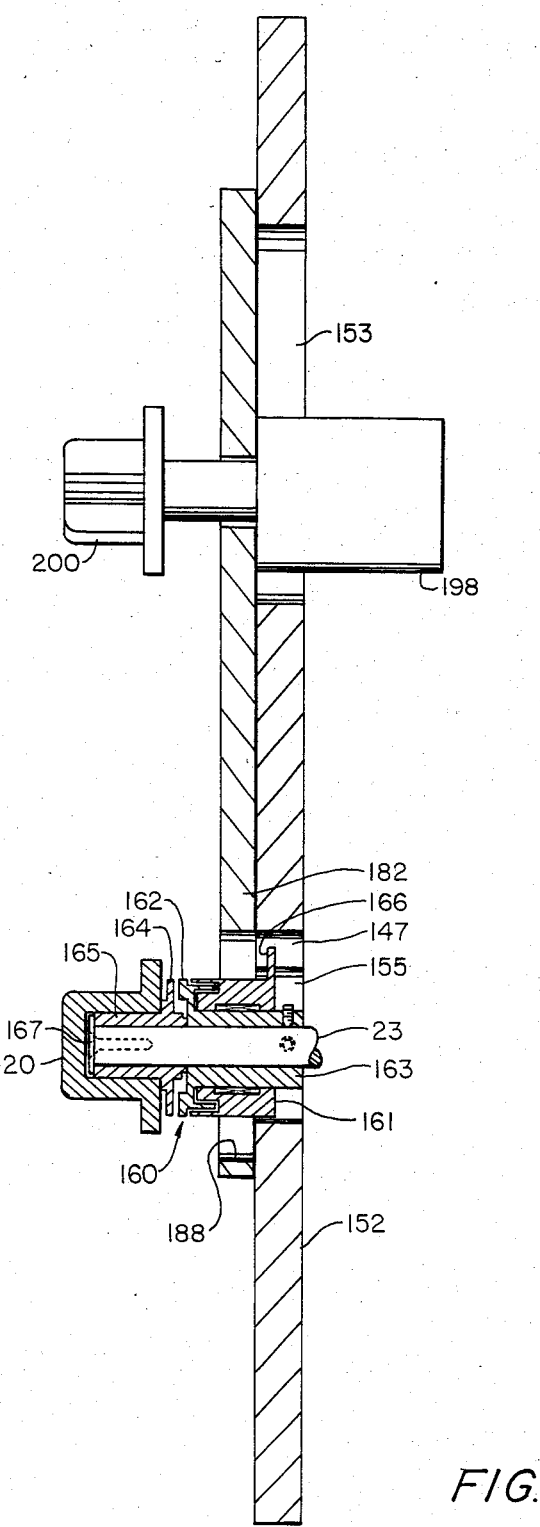
FIG. 12 is a vertical section taken along line 12—12 of FIG. 2 showing details of the motor and clutch means associated with the two spindles.

Carriage plate 152 is movable toward and away from the panel 4 by means of a pneumatic actuator 169 which is attached to plate 154 and has its piston rod 168 connected to carriage plate 152. The function of actuator 169 is to move spindles 20 and 200 into and out of driving engagement with one of the hubs of a C-Zero cassette which is in the loading position hereinafter described. In this connection it is to be noted that front panel 4 is provided with an enlarged aperture 180 (FIG. 3) of irregular shape located directly in front of servomotor carriage 16. In FIG. 10 the piston rod 168 of actuator 169 is shown in its retracted position. In this position the forward ends of spindles 20 and 200 do not project from the front side of panel 4. In FIG. 11 the piston rod of actuator 169 is shown in its extended position. In this position spindles 20 and 200 will project through aperture 180 and be engaged with the hubs of a cassette if a cassette is in the loading position. As can be seen in FIGS. 10 and 11, piston rod 168 is connected indirectly to carriage plate 152 by means of a bracket 170 affixed to the piston rod and the rear side of motor 18. Preferably the forward limit position of plate 152 is determined by its engagement with the rear side of panel 4, while its back or rear limit position is determined by engagement of bracket 170 with plate 154.

Turning now to FIGS. 2 and 3, the front side of carriage plate 152 serves as a support for an adaptor plate 182 which is designed to facilitate loading of VHS video cassettes.

Adaptor plate 182 is releasably attached to the front of the carriage plate 120 by means of two screws 184 and is provided with a large aperture 188 near its bottom end in concentric relation with spindle 20 and clutch 160. Aperture 188 is oversized with respect to clutch 160. Attached to and projecting forwardly from plate 182 are three locator pins 190, 192 and 194 and a cassette hub unlocking pin 195. The free (forward) ends of pins 190 and 192 terminate in tapered ends and have shoulders 193 spaced rearward of the tapered front ends by like amounts. The free (forward) end of pin 194 terminates in a flat surface which is co-planar with shoulders 193. Attached to the rear side of adaptor plate 182 directly above aperture 188 is a leader-shifting assembly comprising a small electric motor 198 having a spindle 200 attached to its output shaft. The function of motor 198 is to make certain that excess leader tape is unwound from the bottom hub of the cassette being loaded, so as to assure that when the leader is cut the section attached to the bottom hub will have a predetermined length. Motor 198 projects through the opening 153 in carriage plate 152, while spindle 200 projects through an oversized hole in adaptor plate 182. Spindle 200 has a front end shaped so that it will easily enter the depression on the rear side of the upper hub of a VHS cassette disposed in loading position and cause the hub to rotate with it. Spindle 200 also helps to center or align a cassette in loading position. A cassette with its upper and lower hubs engaged by spindles 200 and 20 respectively is considered to be in the cassette loading position.

The cassette adaptor plate 182 also carries a flat forwardly projecting arm 204 which is located adjacent the upper left hand corner of the adaptor plate and serves as a door opener for a VHS cassette in cassette loading position.

The adaptor plate also carries a lower leader extractor assembly in the form of a pneumatic actuator 210 having an enlarged extractor pin support member 214 affixed to the end of its piston rod. Pin support 214 is restrained against rotation on its axis by virtue of its being slidably keyed to a guide 212 attached to actuator 210. Pin support member 214 carries a forwardly projecting pin 216 which is used to extract the leader adjacent the bottom hub of a cassette located in loading position. Pin 216 has a constant diameter except that it has a conically tapered front end. Pin 216 extends perpendicularly to the adaptor plate and panel 4.

A second leader extractor assembly is mounted for movement with carriage plate 152. This second leader extractor assembly comprises an actuator 232 (see FIGS. 2-4, 10 and 11) whose cylinder is attached to an actuator support member 234 attached to one of the bushing assemblies 158. This second leader extractor assembly also includes an extractor pin support guide 236. Actuator 232 is mounted at an angle and its piston rod 237 carries an extractor pin support member 238 which is incapable of rotating on its axis by virtue of being slidably keyed to guide 136. Pin support member 38 carries a small flat bar 242 (FIG. 3) which has one end secured to member 238 by a screw 244 and has a leader extractor pin 248 projecting forward from its opposite end. Pin 248 has a constant diameter except that it has a conically tapered front (free) end. Pin 248 extends perpendicularly to the adaptor plate and is disposed so that it can project through aperture 180 when the carriage is moved forward. Flat bar 242 extends in front of extractor pin support guide 236 and its angle relative to the piston rod may be adjusted by releasing screw 244, pivoting it about screw 244, and then retightening screw 244 to hold it in its new position.

The angular position of bar 242 is set according to whether a VHS or Betamax cassette is to be loaded. In FIGS. 2 and 3, bar 242 is in the position required for loading a VHS cassette.

In this connection it is to be noted that VHS and Betmax cassettes differ in size, notably in the spacing between their cassette hubs. Accordingly to accommodate this difference in cassette sizes, the carriage support assembly 17 is adapted to be shifted vertically by an amount sufficient to permit the machine to handle either type of cassette. This feature is illustrated in FIGS. 2-4, 10 and 11 where the front panel 4 is shown to have four vertically elongated openings 250, two disposed above and two disposed below the irregular aperture 180, to accommodate screws 159 which lock slide rods 156 to the panel. As shown in FIGS. 2 and 3, the front side of panel 4 is bevelled around openings 250 to form countersinks 251 for seating the heads of screws 159, so that when the screws are tightened their heads will not protrude from the front side of the panel. By loosening screws 159, it is possible to move the carriage support assembly 17 up or down as required to handle a VHS or Betamax cassette. Preferably the openings 250 are sized in length so that when the screws 159 are shifted to the bottom ends of the openings (FIGS. 2 and 3), the machine is set to load VHS cassettes, and when the screws are shifted to the upper ends of the openings 250 (FIG. 20) the machine is set to load Betamax cassettes.

Figure 13:
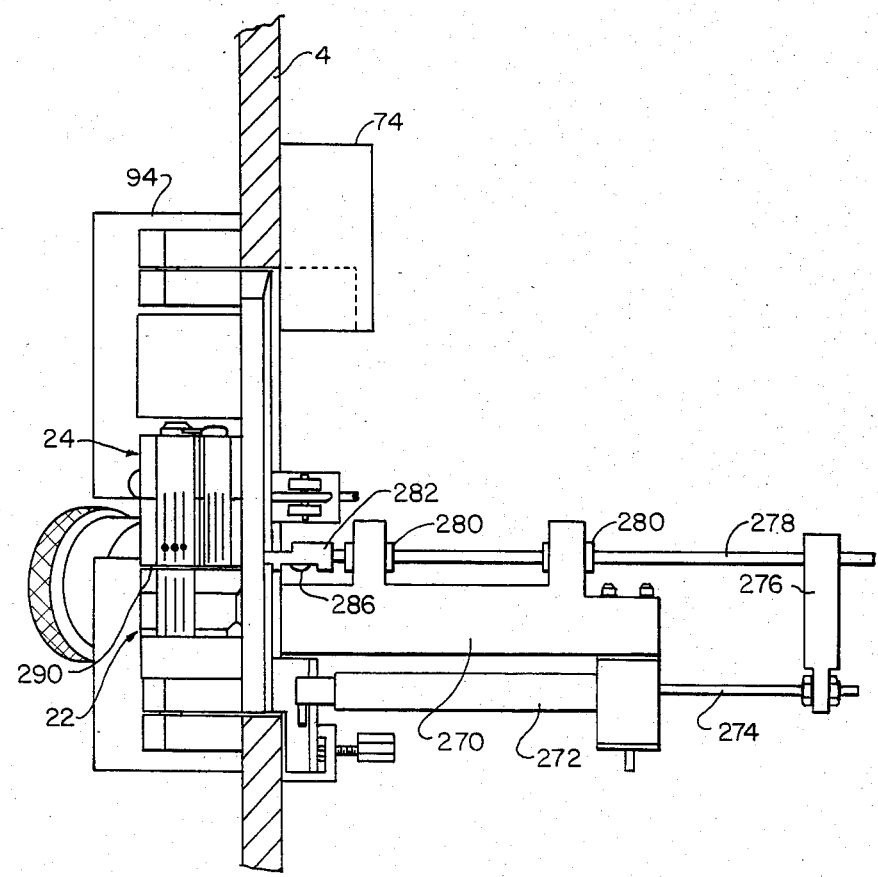
FIG. 13 is similar to FIG. 5 but with the tape cutting mechanism added and the rotatable splicing block in a different position.

Cutting of the leader tape of a C-Zero cassette and the magnetic tape which is wound into the cassette is achieved by a knife mechanism which, as shown in part in FIGS. 10, 11 and 13, comprises a bracket 270 which is attached to the rear side of panel 4. Attached to bracket 270 is an actuator 272 having a piston rod 274 to which is attached a connecting arm 276. The latter also is connected to the rear end of a slide rod 278 which slidably extends through two bushings 280 attached to two lateral extensions of bracket 270. The forward end of slide rod 278 carries a knife holder 282. A knife blade 284 (FIGS. 2 and 3) is releasably secured to holder 282 by a screw 286. Slide rod 278 is positioned so that when it is reciprocated by actuator 272, the knife blade will reciprocate into and out of the narrow gap 290 (FIGS. 5 and 13) which exists between splicing blocks 22 and 24, whereby any magnetic tape or leader tape extending across the gap will be severed by the knife. A further detailed description of the knife assembly is not believed to be necessary since such cutters are well known in the prior art and various forms of knife assemblies may be used in practicing this invention.

The cassette feeder mechanism 9 shown in FIGS. 1, 2, 4 and 16 is designed to hold a plurality of VHS type C-Zero cassettes to be loaded and to feed such cassettes one at a time to the loading position. The mechanism comprises a mounting plate 300 which is releasably attached to the front panel 4 by suitable screw fasteners (not shown). Secured to plate 300 one behind the other are two cassette guide bars 302 and 303 and a magazine-support bar 304. Guide bars 302 and 303 are identical in width and are aligned with one another so that their inner edges lie in a common vertical plane and form a right hand guide for cassettes. Bars 302 and 303 are spaced from one another by spacers 305 so that a side opening 306 is provided to accommodate the arm 412 of a pusher type cassette feeder assembly hereinafter described. Secured to one side of plate 300 and also to bar 304 is an inclined magazine assembly 309 (FIG. 16) comprising two side sections 308 and 310 (FIGS. 1 and 16) which have bottom flanges 312 and 314 respectively that are connected by means of two cross-bars 318 and 319. Side section 308 is secured to the inner edge of bar 304 so that its inner side surface is flush with the inner surface of bars 302 and 303. Side section 310 is secured to the left hand edge of plate 300 (as viewed in FIG. 1). Bottom flanges 312 and 314 function as the cassette-supporting floor of the magazine.

The magazine assembly also includes a cassette restraining means comprising a block 322 affixed to bar 319, a lever arm 324 located in a groove in block 322 and pivotally supported by a pivot pin 326, a pin 328 secured to block 322 and extending through an oversized hole in arm 324, a compression spring 330 surrounding pin 328 and coacting with the head of pin 328 to urge arm 324 to pivot counterclockwise as seen in FIG. 16, and a roller 332 rotatably attached to a yoke portion of arm 324. Roller 332 extends up between flanges 312 and 314 of the magazine and is disposed so that it will support a cassette in the magazine which lies against the front surface of plate 300, i.e., the "first" cassette.

Attached to the side of side section 308 is a support bracket 338 having a bifurcated yoke section which embraces and is pivotally connected to an L-shaped cassette clamp 342 by a pivot pin 344. Also attached to bracket 338 by a collar 345 is the cylinder of a small pneumatic actuator 348. The free end of the piston rod of actuator 348 is provided with a rounded head 350 which is in position to actuate clamp 342. The latter has a first portion 352 extending laterally of side section 308 in position to be engaged by head 350 and a second portion 354 which is aligned with a slot in side section 308 and extends at a right angle to the first portion 352. Clamp 342 is arranged so that gravity will urge it to assume the at-rest position shown in FIG. 1 when the piston rod of actuator 348 is in retracted position. In this retracted position section 354 of clamp 342 does not protrude into the magazine. However, when actuator 348 is operated so as to extend its piston rod, the rounded head 350 will engage section 352 of clamp 342 and cause the latter to pivot counter-clockwise (as viewed in FIG. 1) so that section 354 will protrude into the magazine and thereby engage and prevent a cassette located in its path of pivotal movement from descending further in the magazine toward front panel 4.

Still referring to FIGS. 1 and 16, a pair of parallel slide rods 370 and 372 are attached to and extend forwardly at a right angle from plate 300. Attached to the front ends of rods 370 and 372 by screws 377 is a stop plate 376. Attached to the stop plate is a pneumatic actuator 380 having a piston rod which extends through an oversized hole in stop plate 76 and is affixed to a cassette support/eject platform 386 which is slidably supported by rods 370 and 372. Platform 386 has a pair of parallel bores in which are disposed suitable bushings (not shown) which slidably surround and engage rods 370 and 372. Actuator 380 acts on command to move platform 386 between a first position where it is engaged with plate 300 and a second position (FIG. 16) where it is engaged with stop plate 376. The stroke of platform 386, i.e., the length of its travel between plate 300 and stop plate 376 exceeds the thickness of the cassette to be loaded by a suitable amount such that when the platform moves into engagement with stop plate 376, a cassette may drop freely by gravity out of the loading position to a suitable receptacle or conveyor whereby it may be transported away from the loading machine.

Still referring to FIGS. 1 and 16, the platform 386 carries an upstanding plate 390 to which is attached a cassette restraining assembly comprising an L-shaped pivot support block 392 and a cassette restraining arm 394 pivotally connected by a pivot pin to block 392. A pin 398 connected to block 392 extends through an elongate oversized hole in arm 394. Pin 398 is surrounded by a compression spring 400 which urges arm 394 against support 392. Rotatably attached to the upper end of arm 394 is a roller 402 which is sized and located so that as platform 386 moves to its inner limit position against plate 300, the roller will engage a cassette which has been dropped to the loading position and force the latter tight against plate 300. An L-shaped cassette guide member 404 (FIG. 1) is affixed to bar 304 and projects laterally over roller 402. The side of member 404 facing panel 4 is provided with a resilient cover layer 406 which is sized and positioned so as to be engaged by a cassette dropping down from the magazine onto platform 386 and thereby decellerate the dropping down movement of the cassette. A second inlaid resilient layer 408 on the upper side of platform 386 cushions the cassette as it drops down onto platform 386.

Referring now to FIGS. 1, 2, 4 and 16, the cassette storing and feeding mechanism 9 also includes a cassette pusher in the form of an arm 412 which is movable with a carriage block 414 (FIG. 16) located behind front panel 4. Carriage block 414 has a tongue section 416 which projects through a vertical slot 418 in front panel 4 and one end of arm 412 is attached to tongue section 416. Arm 412 extends through the space 306 and a first upwardly projecting (and preferably transparent) vertical cassette blocking plate 420 is attached to its front side and a small projection 422 is attached to and depends from the free end of arm 412. Projection 422 serves to unlock the door of a VHS cassette to be loaded and plate 420 serves to prevent a second cassette in the magazine from passing past clamp 342 up against plate 300 while a cassette is still in loading position. Projection 422 is located so as to engage and operate the door latch of a VHS cassette which is pushed by arm 412 down onto platform 386.

As seen in FIG. 16, carriage block 414 is attached to a U-shaped metal coupling member 424 which is attached to the ends of two cables 426A, 426B which ride over two pulleys 428A and B carried by pillow blocks 430 affixed to the opposite ends of the cylinder of a pneumatic actuator 433. Cables 426A and B extend through suitable seals (not shown) in the opposite ends of the actuator's cylinder and are attached to opposite ends of the actuator's piston (not shown), whereby when the piston moves in one direction or another, the cables will move with it and thereby cause the carriage to move up or down along slot 418. The opposite ends of the actuator's cylinder are provided with hose fittings 434A and B through which high pressure air may be injected or relieved so as to cause movement of its piston. Pillow blocks 430 are attached to two support plates 436A and B which are affixed to the rear side of panel 4 and serve as fixed supports for two vertical slide rods 438A and 438B. Carriage 414 has two parallel bores through which extend the slide rods 436A and B. Carriage 414 can be moved along its slide rods by actuator 433 for the full length of slot 418. When carriage 414 is in its topmost position in slot 418, arm 412 is high enough to allow the first cassette in the magazine to advance from clamp 342 to the bottom end of the magazine up against plate 30, where it is supported by roller 332. When arm 412 is moved down it will engage that cassette and force it down onto platform 386. Roller 332 will yield enough to allow the cassette to move down out of the magazine but spring 330 is strong enough to cause roller 332 to keep the cassette against plate 300. The pressure of roller 332 restrains downward movement of the cassette by pusher arm 412, and this avoids possible damage to the cassette as might occur from the impact of a lengthy free fall down to platform 386. When carriage 414 reaches the bottom of slot 418, cassette blocking plate 420 on arm 412 will project above the lower end of the magazine, i.e., above magazine flanges 312 and 314, far enough to prevent a cassette from advancing from the magazine up against plate 300.

Referring now to FIGS. 17 and 18, a typical VHS cassette 440 comprises a cassette body having top and bottom wall sections 442 and 443, a rear side wall section 444, and two end sections 445 and 446. At its front end the cassette has a door or cover member 447 having a top wall section 448, opposite end wall sections 450 and 451, and a front wall section 452. Cover member 447 is pivotally secured to the cassette body end wall sections 445 and 446 and is springbiased so that it will tend to remain closed. The cassette also has a spring-biased locking pin 458, and a depression 460 in the inner surface of end section 450 of door member 447 receives locking pin 458 when the door is in closed position. A spring biased unlocking pin 461 projects from end wall section 445 into an edge slot in cover section 450. When pin 461 is pressed into the cassette, locking pin 458 will move out of depression 460 so as to unlock the door 447. The cassette body additionally has a number of cavities 463, 464 and 465 and edge slots 471 and 473.

The cassette 440 also comprises two rotatable cassette hubs 467 and 468 each formed with a spindle-receiving depression 469 defined by a series of teeth 470 that allow the hubs to be lockingly engaged by the two cassette spindles of a VCR machine.

Cavities 463 and 464 are merely blind holes which receive locator pins 190 and 192 respectively. Cavity 465 leads to a hub locking mechanism (not shown) and receives hub unlocking pin 195 which will unlock the two hubs.

FIG. 19 shows schematically the control system for the machine. The control system employs a microprocessor based programmable controller 474 for controlling the operating sequence of the motors 18, 19 and 198 and a plurality of solenoid operated valves that control application of pressurized air to the several actuators and vacuum to the splicing block assembly and the plunger of splicer 6.

Various types of programmable controllers may be employed in practicing the present invention but a programmable microprocessor-based controller is preferred since it permits precise control of the timing of the operations which make up the operating cycle of the machine, and also is reliable and takes up relatively little space in the console.

FIG. 19 shows the cylinders 54, 64, 118, 135, 169, 210, 232, 272, 348, 380 and 433 connected to a plurality of solenoid actuated control valves 474 - 484 which control the application of air to the aforesaid actuators. FIG. 19 also shows solenoid actuated valves 485, 486, 487 and 488 for controlling application of vacuum to splicing block tracks 42, 46, and 48 and the plunger 134 of splicer 6. The air supply is typically an electrically powered air compressor (not shown) and the vacuum generator is typically a vacuum pump or a venturi-type vacuum device. The microprocessor based controller has signal lines connected to the solenoids of the aforesaid control valves and is programmed so as to cause the valves to apply pressurized air or vacuum to the various components in the sequence required to permit the machine to operate in the manner hereinafter described. The controller is connected to motors 18 and 19 via servo circuits 489 and 490 respectively which control operation of the motors in response to signals from the controller. The controller also is connected to leader motor 198, clutch 160 and tension motor 33 so as to control their operation and also is connected to receive the signal outputs of potentiometer 21 and the footage counting transducer 15. Additionally, although not shown in FIG. 1, the machine also includes a plurality of manually operated switches 492 which are connected to controller 474 and are arranged so as to selectively cause the controller to cause the machine to accomplish specific operations, e.g., automatic loading of cassettes or individual testing of specific functions, e.g., splicing, cutting, shifting of splicing block 24, movement of splicing block support 26, etc.

Controller 474 is programmed to cause the machine to operate automatically in the manner hereinafter described. For this purpose the controller is programmed so as to cause supply reel motor 19 to run at a selected speed during winding of tape and to accelerate and decelerate smoothly according to a predetermined function. The controller also is programmed to control the speed of servomotor 18 in accordance with the tension signal output of potentiometer 21 so as to maintain a suitable constant tension on tape 8 as it is being unwound from the supply reel and loaded into a cassette. The program of the controller also controls (1) operation of motor 198 so as to shift the leader in the manner hereinafter described, (2) energization of motor 33 whenever the machine is turned on, (3) actuation of clutch 160 whenever motor 18 is turned on, and (4) the stopping of motors 18 and 19 whenever the count of signals from the transducer 15 reaches a predetermined value representative of the length of tape required to be loaded into a cassette.

Operation of the machine shown in FIGS. 1–16 and 19 will now be described.

Assume that the machine motors 18, 19, 33 and 198 are off, no cassettes are in the magazine, the cassette pusher arm 412 is in its top limit position, the splicing block assembly is in the position shown in FIG. 11 so that the support 26 is flush with front panel 4 and tape tracks 42 and 46 are aligned with one another, vacuum is being applied to tape tracks 42, 46 and 48, and platform 386 is engaged with plate 300. Assume also that a reel of blank magnetic tape 8 to be loaded into a cassette is attached to supply hub 7 and that the magnetic tape extends from the supply reel to the track 48 via idler rolls 10, counter wheel 11, and idler 12. Assume also that the leading end of the magnetic tape in track 48 has been previously cut square by operation of the cutter mechanism and is flush with the end of the track 48 adjacent the gap 290. Now a plurality of VHS cassettes is loaded into the magazine 309 between the members 308 and 310. The cassettes are stacked one behind the other in the magazine in staircase fashion (as shown in phantom in FIG. 16), with the plane of each cassette being vertical and with the first cassette resting flat against the front panel 4 and supported by the roller 332.

Operation of the machine is now initiated.

Immediately controller 474 will cause tension motor 33 to be energized and draw tension arm 13 toward the right hand end of slot 37 (as seen is FIG. 1). At the same time the controller will cause clamp actuator 348 to pivot clamp 342 so as clamp the second cassette in the magazine. Then controller will cause actuator 433 to move pusher arm 412 down into engagement with the first cassette in the magazine, forcing that cassette past roller 332 down onto the platform 386. As that cassette moves free of roller 332 and drops onto platform 386, it is decelerated by engagement of the roller 402 which moves rearwardly against the action of spring 400 so as to allow the cassette to seat on platform 386. Once the first cassette has reached platform 386, roller 402 holds it against plate 300. With the first cassette now in loading position and its door unlocked due to pin 461 being depressed by projection 422, the controller will cause drive motor carriage assembly 17 to move forward far enough so that (a) pin 194 will engage the back surface 433 of the first cassette, (b) locator pins 190 and 192 will enter the locator holes 463 and 464 of the first cassette and thereby hold it against lateral movement, (c) pin 195 will enter the hole 465 to unlock the two hubs 467 and 468, (d) arm 204 will engage the edge of the front wall 452 of door 447 so as to cause the latter to open wide enough to allow its leader tape (shown in phantom at 449 in FIG. 18) to be withdrawn as hereinafter described, (e) drive spindles 20 and 200 enter the depressions 469 in upper and lower hubs 467 and 468 respectively, (f) and leader extractor pins 216 and 244 enter the edge slots 471 and 473 of the cassette behind leader tape 449. At this point the front side of the first cassette is restrained by plate 404 while at its back side it is restrained by the end surface of pin 194 and the shoulders 193 of pins 190 and 192.

Thereafter controller 474 causes leader motor 198 to be energized so as to unwind the leader from hub 468 and wind it onto hub 467. Motor 198 is on just long enough to unwind as much leader as possible without detaching it from hub 468. Then controller 474 causes actuators 210 and 232 of the two leader extractor assemblies to be operated so as to cause their piston rods to be extended, whereby extractor pins 216 and 244 will (a) engage the leader 449, (b) withdraw it from the cassette and (c) place it in tracks 42 and 46. Since at this time vacuum is being applied to all of the tracks of the splicing block assembly, the withdrawn leader 449 will be held in tracks 42 and 46 by suction. The leading end of tape 8 will likewise be held by suction in track 48. Once the leader has been placed in tracks 42 and 44, the controller causes leader extractor pins 216 and 244 to be returned to their normal position and also causes cutter actuator 272 to be operated so that cause knife blade 282 will reciprocate forwardly and backwardly through gap 290 to cut the leader tape into two sections. As soon as the cutter blade has been retracted to its normal at-rest position, controller 474 causes actuator 54 to rotate movable splicing block 24 so as to align the magnetic tape in track 48 with the leader section in track 42 (FIG. 5). Then controller 474 causes actuator 64 to pivot plate 26 to the position shown in FIGS. 7 and 9 so as to place tracks 42 and 48 in alignment with plunger 134 of splicer 6. The controller then causes splicer actuator 135 to be operated so as to cause a length of splicing tape to be cut and pressed over the abutting ends of the leader and magnetic tape. As soon as the plunger of the splicer has retracted to its normal at-rest position, the controller 474 causes actuator 64 to swing plate 26 swing back to its original flush position (FIG. 5), thereby placing the tracks 48 and 42 in a plane which extends at a right angle to panel 4 and is parallel to a plane through the axes of spindles 20 and 200 (FIGS. 5 and 6). As soon as the splicing block assembly reaches this parallel position, the controller causes (a) valves 485 and 487 to interrupt the vacuum connection to tracks 42 and 48, (b) clutch 160 to be actuated, and (c) servomotors 18 and 19 to be turned on, so as to accomplish winding of tape onto the hub 468 of the first cassette.

After a predetermined amount of magnetic tape has been wound into the cassette, as determined by the output from counter transducer 15, controller 474 causes (a) servomotors 18 and 19 to be turned off, (b) leader extractor pins 216 and 244 to be again extended so as to make certain that the magnetic tape is seated in the tracks 42 and 48 and (c) suction to be reapplied to tracks 42 and 48 so as to again clamp the tape to those tracks. Then the controller causes the cutter mechanism to again operate to sever the magnetic tape. Thereafter, the controller causes splicing block 24 to be rotated to place the second leader section in track 46 in alignment with the tape in track 42 (FIG. 6). Then the controller causes actuator 64 to again pivot plate 26 to the position shown in FIG. 7. Next the controller causes splicer 6 to apply a piece of splicing tape to the abutting ends of the second leader section and the end of the magnetic tape wound into the cassette. Once this has been done, controller 474 causes actuator 64 again to rotate plate 26 to place track 42 into a plane extending at a right angle to panel 4 and parallel to the axes of spindles 20 and 200. Then the controller causes the vacuum to tracks 42 and 46 to be turned off and wind motor 18 is again turned on so as to wind the trailing end of the magnetic tape and the second leader section into the cassette. Then controller 474 causes motor 18 to stop and carriage assembly 17 to be retracted so as to free the motor spindles, locator pins and leader extractor pins from the cassette. As the carriage 16 is withdrawn, the cassette door 447 is free to close under its operating spring bias. As soon as the carriage has retracted free of the loaded cassette, the controller will cause the platform 386 to move away from plate 300, thereby allowing the loaded cassette to be discharged by gravity from the machine. Then controller 474 causes platform 386 to be moved back against plate 300 and causes cassette pusher arm 412 to be raised to its upper limit position. As or before arm 412 is raised, the controller causes clamp 342 to be released so as to allow the second cassette to move forward against plate 300 as soon as arm 412 has moved high enough so as not to block the second cassette. Then controller 474 causes clamp 342 to move into locking engagement with the third cassette in the magazine and also causes cassette pusher arm 412 to again move down so as to force the second cassette past restraining roller 332. The cassette drops down under the influence of the pusher 412 to the platform 386 where it is again held against the panel by roller 402, and the operation above-described is then repeated to load tape into the second cassette.

In the event that it is desired to load magnetic tape into Betamax type cassettes, the machine is subjected to a mechanical changeover which adapts it for the handling of Betamax cassettes. This change-over involves replacing the adaptor plate 182 with a second adaptor plate 182B (FIG. 20). Adaptor plate 182B is similar to adaptor plate 180 except that the lower leader extractor actuator 210 and motor 198 are in a slightly different positions due to the fact that the Betamax cassette is somewhat shorter in length and its hubs are closer together. Additionally, the upper leader extractor assembly is modified by releasing the screw 248 and pivoting the short bar 242 so that its leader extractor pin 244 is in the down position shown in FIG. 20. The changeover also requires the takeup motor carriage 16 to be shifted by releasing the screws 159, moving the carriage assembly up for the full length of the holes 250, and then retightening screws 159.

The changeover for loading Betamax cassettes further includes removing the cassette storing and feeding mechanism shown in FIGS. 1 and 16 and replacing it with a second feeder mechanism as shown in FIG. 21. This feeder mechanism is substantially identical to the previously described feeder mechanism except that the spacing between the side plates 308 and 310 of the magazine is less and the stroke of arm 412 is adjusted to accommodate for the fact that the Betamax cassettes are somewhat narrower and have a shorter length. Also this feeder mechanism includes a different means for unlocking the cassette door.

Except for operation of door unlocking actuator 540 hereinafter described, operation of the machine when loading Betamax cassettes is the same as when loading VHS cassettes.

Attention is drawn to FIGS. 22 and 23 which illustrate a Betamax cassette. In this case the cassette does not have a separate hub locking mechanism. Instead it has a hub locking mechanism (not shown) which is unlocked at the same time that the cassette door or cover is unlocked. The Betamax type cassette 500 has a spring-biased pivoted door 502 which has a small aperture 504 at one side which receives spring-biased latch pin 506 which extends through a hole in the side of the body adjacent the hinge pivot for the cover. When pin 506 is depressed so as to move it out of aperture 504, the door is free to be opened and at the same time the two cassette hubs are unlocked for rotation.

Accordingly, adaptor plate 182B for the Betamax cassette has only two locator pins 510 and 512 which are identical to locator pins 190 and 192 and which enter apertures 514 and 516 in the rear end of the cassette. The motor spindles 20 and 200 are adapted to fit into the recesses 518 in the rear of the two cassette hubs 520 and 523 and engage the teeth 524. Additionally, the adaptor plate has a small arm 524 similar to the arm 204 for pushing the door open. Arm 524 is shaped and located so that it may engage the rear edge of the front wall 503 of the door 502 near the end opposite to the end having aperture 504 when the carriage 16 is moved to its forward position.

The latch pin 506 is part of a pivoted lach member 528 which is situated in the recess in the cassette body. Latch member 528 is located behind an aperture 530 in the front end of the cassette. The cassette door is unlocked by engaging member 528 via aperture 530 and pressing it inward far enough to free pin 506 from the cover, whereby the cover may be opened by arm 524.

As seen in FIG. 21, the platform 386 has a small actuator 540 mounted in a cavity therein. This actuator has a small projection 542 on the end of its piston rod for unlocking the door of the Betamax cassette. Actuator 540 is located so that when a Betamax cassette is discharged from the magazine and propelled down onto the platform 386, the aperture 504 will be positioned directly over the projection 542. As soon as the cassette has engaged the platform, the controller 474 will cause actuator 540 to force its piston rod upward so that projection 542 will engage latch member 528 and press it into the cassette far enough to free pin 506 from the cassette door 502, whereby the door will be unlocked. Accordingly, when subsequently controller 474 causes the takeup motor carriage 16 to move forward, arm 524 will engage the door and cause the latter to pivot outwardly to expose leader 449. When loading of a Betamax cassette has been completed, carriage 16 is moved rearwardly as previously described, whereupon the door of the cassette will close automatically under its spring bias. Actuator 540 may be released as soon as the cassette door is opened or may be released any time prior to the time when platform 386 is moved forward to eject the loaded cassette.

Obviously the invention may be practiced otherwise than as described above. Thus, for example, support plate 26 may be pivoted by actuator 64 simultaneously with or before or after splicing block 24 is pivoted by actuator 54. A different splicer or cassette feeder mechanism or a different tape cutter mechanism may be employed without departing from the essence of the invention. Also, if shifting the leader so as to wind excess leader onto the upper hub of the cassette is not required, the motor 198 and clutch 160 may be omitted and spindle 200 may be replaced by a simple round shaft sized to fit in the upper hub of the cassette so as to help in keeping it in the proper loading position. Moreover, if it is desired to dedicate the machine so that it will load only one type of cassette, the adaptor plate may be omitted and the lower leader extractor and the locator and door opening pins may be mounted directly to the carriage plate 152. Additionally the machine may be modified so as to accomplish hub loading or to handle a tape with a different width or a different kind of tape or cassette. Still other changes will be obvious to persons skilled in the art.

What is claimed is:

1. In a machine for loading tape into cassettes, a splicer head assembly comprising:
    a splicing block support plate;
    a first splicing block having a first guideway for receiving a first leader or use tape, said first block being affixed to said support plate for movement therewith;
    a second splicing block having a second guideway for receiving a use tape and a third guideway for receiving a leader tape, said second and third guideways being parallel to said first guideway;
    means rotatably mounting said second block to said support plate for rotation on a first axis extending parallel to said second and third guideways;
    means rotatably mounting said support plate for pivotal movement about a second axis extending parallel to said first axis;
    means for rotating said second block on said first axis between a first position in which said first and second guideways are aligned and a second position in which said first and third guideways are aligned; and
    means for pivoting said support plate on said second axis on command between first and second limit positions.

2. A machine for use in splicing a use tape to leader tapes comprising:
    a splicer head assembly and a tape splicer;
    said splicer head assembly comprising a first splicing block having a first guideway for receiving a first use or leader tape a second splicing block having a second guideway for receiving a use tape and a third guideway for receiving a leader tape, said second and third guideways being parallel to one another and also parallel to said first guideway, a splicer block support plate, means rotatably mounting said plate for pivotal movement between first and second support plate limit positions, means securing said first block to said support plate so that said first block and said support plate may move as a unit when said support plate undergoes pivotal movement between said first and second support plate limit positions, means rotatably mounting said second block to said support plate so that said second block can rotate relative to said first block, means for pivotally moving said second block relative to said support plate between first and second block limit positions in which said second and third guideways are aligned respectively with said first guideway, and means for moving said support plate between said first and second support plate limit positions; and
    said splicer comprising a splicing tape-applying member disposed so that (a) said tape-applying member is aligned with and extends perpendicularly to said first guideway and is capable of applying a section of splicing tape to the abutting ends of tapes in said first and second guideways when said support plate is in one of said support plate limit positions and said second block is in its first block limit position, (b) said tape-applying member is aligned with and extends perpendicularly to said first guideway and is capable of applying a section of splicing tape to the abutting ends of tapes in said first and third guideways when said support plate is in said one support plate limit position and said second block is in its second block limit position, and (c) said tape-applying member is out of alignment with said first guideway when said support plate is in the other of its support limit positions.

3. A machine for use in splicing use tapes to leader tapes comprising:
    a splicing block assembly and a tape splicer;
    said splicing block assembly comprising a first stationary splicing block having a first guideway for receiving a first leader or use tape, a second movable block having a second guideway for receiving a use tape and a third guideway for receiving a leader tape, a splicer block assembly support mounted for pivotal movement about a first axis, means mounting said first block to said splicing block assembly support so that said first block and said support will pivot as a unit when said support undergoes pivotal movement about said first axis, means mounting said second block to said support so that said second block can rotate on a second axis extending parallel to said first axis, means for rotating said second block on said second axis between first and second splicing positions in which said second and third guideways are aligned respectively with said first guideway, and means for pivoting said support about said first axis between first and second limit positions;
    said tape splicer comprising a splicing tape-applying member which reciprocates along an axis extending at a right angle to said first and second axes, said tape splicer being disposed so that the reciprocating axis of said splicing tape-applying member is perpendicular (a) to said first and second guideways when said support is in one of its said limit positions and said second block is in its first splicing position, and (b) perpendicular to said first and third guideways when said support is in said one limit position and said second block is in its second splicing position.

4. Apparatus according to claim 3 wherein said second block has first and second prismatic faces, and said first and second splicing positions are determined by the alternate contact of said first and second prismatic faces on said second block with said support.

5. Apparatus according to claim 4 wherein said second and third guideways are angularly displaced from one another about said first axis.

6. Apparatus according to claim 5 wherein said guideway are grooves with flat bottoms.

7. Apparatus according to claim 6 wherein said first and second prismatic faces extend at right angles to the bottoms of said second and third guideways.

8. Apparatus according to claim 3 in combination with a tape cutter mechanism, said tape cutter mechanism comprising a cutter which reciprocates along an axis extending at a right angle to said second axis.

9. Apparatus ccording to claim 8 further including openings in the flat bottoms of said grooves and means for connecting said openings to a source of vacuum so that tapes may be held in said guideways by suction.

10. Apparatus according to claim 9 further including a panel having an opening therein, and further wherein said support is a plate disposed in said opening and pivotally mounted to said panel so that said first and second axes extend parallel to the plane of said panel.

11. Apparatus according to claim 10 wherein said plate is pivotally mounted to said panel by first and second pivot means each including a pivot member located adjacent one end of said plate.

12. Apparatus according to claim 11 further wherein said panel has a front side and a rear side, said first and second blocks are disposed on the front side of said panel, and said means for rotating said support is located on the rear side of said panel.

13. A machine for use in splicing use tapes to leader tapes comprising:
   a front panel, a splicing block assembly, a tape splicer support, and a tape splicer;
   said splicing block assembly comprising a first splicing block having a first guideway for receiving a use or leader tape, a second block having second and third parallel guideways for receiving leader and use tapes respectively, a support plate to which said first block is affixed, means mounting said second block to said support plate so that it is capable of rotation about a first axis extending parallel to said second and third guideways, means for rotating said second block on said first axis between first and second splicing positions in which said second and third guideways are aligned respectively with said first guideway, means mounting said support plate to said front panel so that it is capable of rotating about a second axis extending parallel to said first axis between first and second limit positions, and means for rotating said support plate relative to said front panel between said first and second limit positions;
   said tape splicer support comprising an arm attached to said front panel; and
   said tape splicer being attached to said arm and comprising a splicing tape-applying member which reciprocates along a third axis extending at a right angle to said first and second axes, said tape splicer being disposed so that said tape-applying member reciprocates perpendicularly to said first and second guideways when said support plate is in said first limit position and said second block is in said first splicing position and perpendicularly to said first and third guideways when said support splate is in said first limit position and said second block is in said second splicing position.

14. A machine according to claim 13 further including a tape cutter mechanism comprising an arm extending through an aperture in said front panel, a cutter carried by said arm, and an actuator located behind said front panel for reciprocating said arm and said cutter along an axis extending at a right angle to said second axis and perpendicular to said front panel.

15. A machine according to claim 14 wherein said panel has an opening therein and said support plate is positioned in said opening.

16. A machine according to claim 14 wherein said panel extends in a first plane, said first and second axes extend parallel to said first plane, and said splicer is disposed at an angle to said front panel so that said tape-applying member reciprocates in a plane disposed at an acute angle to said panel.

17. A machine according to claim 15 further including:
   takeup means comprising a rotatable takeup spindle adapted to engage and drive a cassette hub and drive means for rotating said spindle on command;
   a carriage mounting said takeup means so that said spindle extends perpendicular to said panel; and
   means for reciprocating said carriage on command so that said spindle will receiprocate toward and away from said front panel.

18. A machine according to claim 17 further including:
   a magazine for holding a plurality of cassettes to be loaded, said cassettes comprising a pair of rotatable hubs and a leader tape connected to and extending between said pair of hubs;
   a loading station comprising means (a) for holding a cassette in position to be loaded with use tape and (b) for releasing a loaded cassette on command, said means being located so that a cassette positioned in said loading station will be disposed to permit one of its hubs to be engaged by said spindle when said carriage is moved in a first direction relative to said panel;
   means for causing cassettes to be fed one at a time in sequence from said magazine to said loading station; and
   leader extractor means for extracting the leader from a cassette located in said loading station and placing the extracted leader in said first and second guideways.

19. A machine according to claim 18 wherein said leader extractor means comprises means mounted to said carriage.

20. A machine according to claim 19 wherein said leader extractor means comprises first and second movable leader-extracting members engageable with the leader of a cassette in said loading station and being movable in different directions away from said cassette so as to extract said leader and cause it to be positioned in said first and second guideways when said support plate is in said first limit position and said second splicing block is in said first splicing position.

21. A machine according to claim 20 for loading use tape into a cassette of the type which has (a) a door pivotable between a first closed position and a second open position and adapted to conceal the leader tape when it is in said first closed position, and (b) releasable lock means for locking the door, said machine further comprising:

cassette door unlocking means for releasing the said lock means of a cassette delivered to said loading station, means for causing said cassette door unlocking means to unlock the door of a cassette located at said loading station, and door opening means carried by said carriage for opening the unlocked door of a cassette when said carriage moves in said first direction.

22. A machine according to claim 21 wherein said cassette door unlocking means comprises a member movable parallel to the plane of said panel.

23. A machine according to claim 22 wherein said door unlocking means is carried by said carriage.

24. A machine according to claim 22 wherein said door unlocking means is supported by said means for holding a cassette in position to be loaded.

25. A machine according to claim 21 wherein said magazine is arranged to hold a cassette so that its door extends lengthwise parallel to the path of movement of the cassette as it moves from the magazine to the loading station, and said door unlocking means comprises a member which moves parallel to said path of movement.

26. A machine according to claim 21 wherein magazine is arranged to hold a cassette so that its door pivot axis extends parallel to the pivot axis of said second block.

27. A machine according to claim 21 wherein said magazine is arranged so that at least some of the cassettes which it contains are parallel to one another but offset in staircase fashion and each cassette discharged from the magazine to the loading station is disposed so that the pivot axis of its door extends vertically and parallel to said panel.

28. A machine according to claim 21 wherein said panel is vertical, said magazine is inclined to said panel and is located above said loading station, and said first and second blocks are disposed so that said first, second and third guideways extend vertically.

29. Apparatus according to claim 21 further including cassette support means for releasably supporting a cassette to be loaded at said loading station, said cassette support means comprising a platform movable between a first inner position adjacent said panel in which it is capable of intercepting and supporting a cassette discharged from said magazine and a second outer position in which a gap is provided between the platform and panel that is large enough to allow a loaded cassette to be discharged by gravity.

30. Apparatus according to claim 29 further including means for moving said platform from one to the other of its said first and second positions.

31. Apparatus according to claim 30 further including cassette feeder means for forcing the lower-most cassette in the magazine downward into the loading station.

32. Apparatus according to claim 29 further including means for operating said cassette feeder means.

33. Apparatus according to claim 18 further including locator means carried by said carriage for locating a cassette disposed at said loading station so that one hub of said cassette is aligned with said spindle, said locater means being adapted to move into one or more selected recesses in said cassette when said carriage moves forward toward said loading station.

34. A machine for use in loading a use tape into a cassette comprising:

a splicing block assembly comprising a first splicing block having a first guideway for receiving a first tape, a second block having a second and third guideways for receiving second and third tapes, a movable splicer block support plate, means mounting said splicer block support plate for movement about a first axis extending parallel to said first, second and third guideways; means mounting said first block to said splicer block support plate so that said first block and said support may move as a unit about said first axis, means mounting said second block to said support plate so that said second block can rotate on a second axis extending parallel to said first axis, means for rotating said second block on said second axis between first and second splicing positions in which said second and third guideways are aligned respectively with said first guideway, and means for rotating said support plate about said first axis between first and second limit positions;

a tape splicer comprising amovable splicing tape-applying member, said tape splicer being disposed so that movement of said splicing tape-applying member is perpendicular (a) to said first and second guideways when said support is in one of its said limit positions and said second block is in its first splicing position, and (b) perpendicular to said first and third guideways when said support is in said one limit position and said second block is in its second splicing position, means for releasably holding a cassette to be loaded in a selected loading position adjacent said splicing block assembly;

a carriage assembly comprising a carriage, first and second rotatable and parallel spindles spaced from one another so as to be engageable simultaneously with the said first and second hubs respectively of a cassette located in said selected loading position, said spindles also being adapted to cause a hub with which it is engaged to rotate with it;

first motor means for driving said first spindle in a selected direction of rotation on command, and second motor means for driving said second spindle in a selected direction of rotation on command;

means mounting said carriage for movement between a first position in which said spindles are spaced from a cassette disposed in said selected loading position and a second position in which said spindles will engage the hubs of a cassette disposed in said selected loading position; and means for moving said carriage from one to the other of said first and second positions on command.

35. A machine according to claim 34 further including leader extractor means mounted to said carriage.

36. A machine according to claim 35 wherein said leader extractor means comprises first and second movable leader extracting members engageable with the leader of a cassette in said loading position and movable in different directions away from said cassette so as to extract said leader and cause it to be positioned in said first and third guideways when said first splicing block is in said first splicing position.

37. Apparatus according to claim 35 further including locator means carried by said carriage for locating a cassette disposed at said loading station so that one hub of said cassette is aligned with said spindle, said locator means being adapted to move into one or more selected recesses in said cassette when said carriage moves into its said second position.

38. A machine according to claim 37 for loading use tape into a cassette of the type which has (1) a door pivotable between a first closed position and a second open position and adapted to conceal the leader tape when it is in said first closed position, and (2) releasable lock means for locking the door,
  comprising cassette door unlocking means for releasing the said lock means of a cassette in said loading position, means for causing said cassette door unlocking means to unlock the door of a cassette located in said loading position, and door opening means carried by said carriage for opening the unlocked door of a cassette when said carriage moves into its said second position.

39. A machine according to claim 38 wherein said door unlocking means is carried by said carriage.

40. A machine according to claim 39 wherein said door unlocking means is supported by said means for holding a cassette in said loading position.

41. A machine according to claim 36 further including control means for operating all of the aforesaid means in a selected sequence so as to effect loading of use tape into a cassette located in said selected loading position by a method which includes cutting said leader into first and second sections, splicing said use tape to said first leader, winding said first leader and a selected quantity of use tape into said cassette, cutting the use tape so as to provide a trailing end for use tape wound into said cassette, and splicing said trailing end to said second leader section.

* * * * *

UNITED STATES PATENT AND TRADEMARK OFFICE
CERTIFICATE OF CORRECTION

PATENT NO. : 4512904

DATED : April 23, 1985

INVENTOR(S) : James L. King

It is certified that error appears in the above-identified patent and that said Letters Patent is hereby corrected as shown below:

Claim 2, column 19, line 65, insert the word "support" before the word -- plate --;

Claim 9, column 21, line 15, the word "ccording" should be -- according --;

Claim 13, column 21, line 68, the word "splate" should be -- plate --;

Claim 17, column 22, line 27, the word "receiprocate" should be -- reciprocate --;

Claim 26, column 23, line 25, insert the word "said" before the word -- magazine --;

Claim 34, column 24, line 21, the word "amovable" should be -- a movable --; and Claim 38, column 25, line 9, the words "said machine further" should be inserted before the word -- comprising --.

Signed and Sealed this

Thirteenth Day of August 1985

[SEAL]

Attest:

DONALD J. QUIGG

Attesting Officer     Acting Commissioner of Patents and Trademarks